(12) United States Patent
Chang et al.

(10) Patent No.: US 8,904,303 B2
(45) Date of Patent: Dec. 2, 2014

(54) TERMINAL AND METHOD FOR USING THE INTERNET

(75) Inventors: Min Kyoung Chang, Seoul (KR); Joo Hee Son, Seoul (KR); Young Hoon Song, Seoul (KR); Seung Hwan Son, Seoul (KR); Hyo Jin Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 1216 days.

(21) Appl. No.: 12/435,952

(22) Filed: May 5, 2009

(65) Prior Publication Data

US 2010/0115405 A1    May 6, 2010

(30) Foreign Application Priority Data

Nov. 6, 2008 (KR) ........................ 10-2008-0110082

(51) Int. Cl.
| | |
|---|---|
| *G06F 3/048* | (2013.01) |
| *G06F 3/041* | (2006.01) |
| *G06F 17/30* | (2006.01) |
| *G06F 3/0488* | (2013.01) |
| *G06F 3/14* | (2006.01) |

(52) U.S. Cl.
CPC ........ *G06F 3/0416* (2013.01); *G06F 17/30884* (2013.01); *G06F 3/04883* (2013.01)
USPC ........... 715/773; 715/764; 715/769; 715/780; 715/856; 715/864

(58) Field of Classification Search
USPC ......... 715/700, 702, 764, 769, 773, 780, 781, 715/827, 856, 863
See application file for complete search history.

(56) References Cited

U.S. PATENT DOCUMENTS

| | | | | |
|---|---|---|---|---|
| 6,091,409 A | * | 7/2000 | Dickman et al. ............... | 715/847 |
| 6,456,307 B1 | * | 9/2002 | Bates et al. .................... | 715/838 |
| 6,483,525 B1 | * | 11/2002 | Tange ........................... | 715/765 |
| 6,707,468 B2 | * | 3/2004 | Tange ........................... | 715/739 |
| 6,943,778 B1 | * | 9/2005 | Astala et al. ................... | 345/173 |
| 7,383,342 B2 | * | 6/2008 | Spriestersbach et al. ..... | 709/228 |
| 2002/0156870 A1 | | 10/2002 | Boroumand et al. | |
| 2003/0193481 A1 | * | 10/2003 | Sokolsky ...................... | 345/173 |
| 2007/0277123 A1 | | 11/2007 | Shin et al. | |
| 2008/0040426 A1 | * | 2/2008 | Synstelien et al. ............ | 709/203 |

(Continued)

OTHER PUBLICATIONS

CyberNotes: Quickly Assign Hotkeys to Folders, Programs, URL's, and More, Aug. 14, 2008, 6 pages.*

(Continued)

*Primary Examiner* — Matt Kim
*Assistant Examiner* — Yongjia Pan
(74) *Attorney, Agent, or Firm* — Lee, Hong, Degerman, Kang & Waimey

(57) ABSTRACT

A mobile communication terminal is provided. The mobile communication terminal includes a memory, a touch screen, and a controller. The touch screen is configured to display an Internet address input window, at least a portion of an Internet page corresponding to an Internet address in the Internet address input window, and a virtual key pad. The controller is configured to generate a duplicate window of the Internet address input window in response to a first touch input performed on the Internet address input window, move the duplicate window in response to a drag operation, store the Internet address in a memory in response to dropping the moved duplicate window on a key in the virtual key pad, and generate a short-cut by assigning the stored Internet address to the key.

12 Claims, 16 Drawing Sheets

(56) References Cited

U.S. PATENT DOCUMENTS

| | | | |
|---|---|---|---|
| 2008/0040681 A1 | 2/2008 | Synstelien et al. | |
| 2008/0082934 A1* | 4/2008 | Kocienda et al. | 715/773 |
| 2008/0094368 A1* | 4/2008 | Ording et al. | 345/173 |
| 2008/0109733 A1 | 5/2008 | Kim et al. | |
| 2008/0259045 A1* | 10/2008 | Kim et al. | 345/173 |
| 2009/0024946 A1* | 1/2009 | Gotz | 715/769 |
| 2009/0303187 A1* | 12/2009 | Pallakoff | 345/169 |
| 2011/0083097 A1* | 4/2011 | Miner et al. | 715/780 |
| 2011/0154188 A1* | 6/2011 | Forstall et al. | 715/236 |

OTHER PUBLICATIONS

Mozilla's Firefox 3, Jun. 17, 2008, 3 pages.*
Qliner Hotkeys, Nov. 21, 2006, 5 pages.*

* cited by examiner

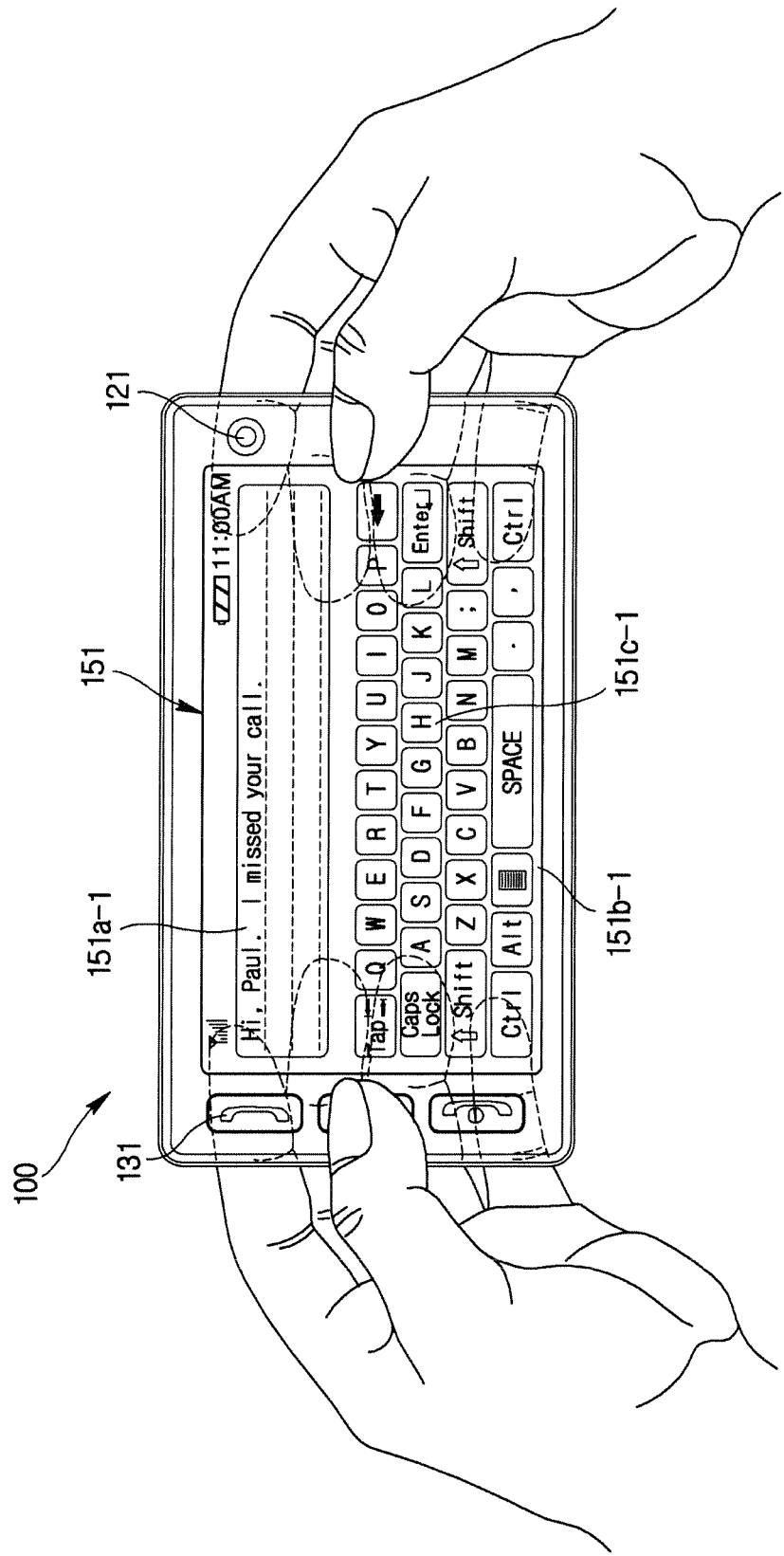

TERMINAL AND METHOD FOR USING THE INTERNET

CROSS-REFERENCE TO RELATED APPLICATIONS

Pursuant to 35 U.S.C. §119, this application claims the benefit of Korean Application No. 10-2008-0110082, filed on Nov. 6, 2008, the contents of which are hereby incorporated by reference herein in their entirety.

FIELD OF THE INVENTION

The present invention relates to mobile communication terminals, and particularly, to the functions of mobile communication terminals.

DESCRIPTION OF THE RELATED ART

The diversity in the functions available in modern mobile communication terminals, such as personal computers, laptop computers, and cellular telephones is rapidly expanding. For example, mobile terminals typically include a number of complicated functions, such as taking photos or videos, displaying music files or video files, playing games, and receiving broadcasts. Moreover, mobile terminals are being implemented as integrated multimedia devices.

Terminals can be divided into mobile terminals and stationary terminals. In general, the mobile terminals can be classified as handheld terminals or vehicle mounted terminals, where such classification may depend on the user's ability to transport the particular mobile communication terminal.

Various attempts have been made to implement complicated functions in such terminals by means of hardware and/or software. In particular, such terminals are generally configured to communicate with wireless networks and to access the Internet.

It would be desirable to increase the capabilities of such terminals by providing additional features and support for facilitating faster and more efficient communication with wireless networks, such as the Internet.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one aspect of the invention, a mobile communication terminal is provided. The mobile communication terminal includes a memory configured to store information; a touch screen configured to display an Internet address input window, at least a portion of an Internet page corresponding to an Internet address in the Internet address input window, and a virtual key pad. The mobile communication terminal further includes a controller configured to generate a duplicate window of the Internet address input window in response to a touch input performed on the Internet address input window, to move the duplicate window in response to a drag operation, to store the Internet address in a memory in response to dropping the moved duplicate window on a key in the virtual key pad, and to generate a short-cut by assigning the stored Internet address to the key.

It is contemplated that the controller is further configured to generate a bubble window displaying the Internet address assigned to the key in response to a touch input performed on the key. It is further contemplated that the controller is configured to display the Internet address assigned to the key in response to a touch input performed on the key.

It is contemplated that the controller is configured to display the at least a portion of an Internet page corresponding to the Internet address assigned to the key in response to a touch input performed on the key in the virtual key pad for a predetermined time. It is further contemplated that the controller is further configured to display the key differently from another key in the virtual key pad to enable identification of the key.

In one aspect of the invention, a method for accessing an Internet in a mobile communication terminal is provided. The method includes detecting a drag operation performed on an Internet address input window including an Internet address; detecting a drop operation corresponding to the drag operation on a key in a virtual key pad; storing the Internet address in a memory; and assigning the stored Internet address to the key to generate a short-cut.

It is contemplated that the detecting the drag operation includes detecting a touch input on an area comprising the Internet address input window including the Internet address; detecting a movement of the touch input while the touch input is maintained; and moving a duplicate window which includes the Internet address input window contents in response to the movement.

It is contemplated that the method further includes displaying a window informing that the Internet address has been assigned to the key.

It is contemplated that the method further includes receiving a first touch input on the key in the virtual key pad via a pointing device; displaying the Internet address assigned to the key in the Internet address input window; and displaying at least a portion of an Internet page corresponding to the Internet address if an input signal is not received for a predetermined time or if a command for accessing the Internet page is executed.

It is contemplated that the method includes detecting a proximity touch input on the key in the virtual key pad via a pointing device and displaying the Internet address of the Internet address short-cut assigned to the key in response to the proximity touch input.

It is contemplated that the method further includes receiving a first touch input on the key in the virtual key pad via a pointing device for a predetermined time and displaying at least a portion of an Internet page corresponding to the Internet address assigned to the key.

It is contemplated that the method further includes displaying the Internet address assigned to the key in response to the first touch input performed on the key on the virtual key pad. It is further contemplate that the method includes detecting a second touch input performed on the Internet address input window, wherein the Internet address input window enters a mode for receiving inputs in response to the second touch input.

It is contemplated that the method further includes detecting a second touch input performed on the Internet address input window.

It is contemplated that the method further includes displaying a character in the Internet address input window corresponding to the key in response to a second touch input performed on the key. It is further contemplated that receiving the first touch input includes displaying the Internet address assigned to the key in the Internet address input window in response to the first touch input performed on the key for the predetermined time.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 3B shows a front view of a mobile terminal in a landscape orientation in accordance with one embodiment of the invention.

DETAILED DESCRIPTION OF THE PREFERRED EMBODIMENTS

Figure 1:
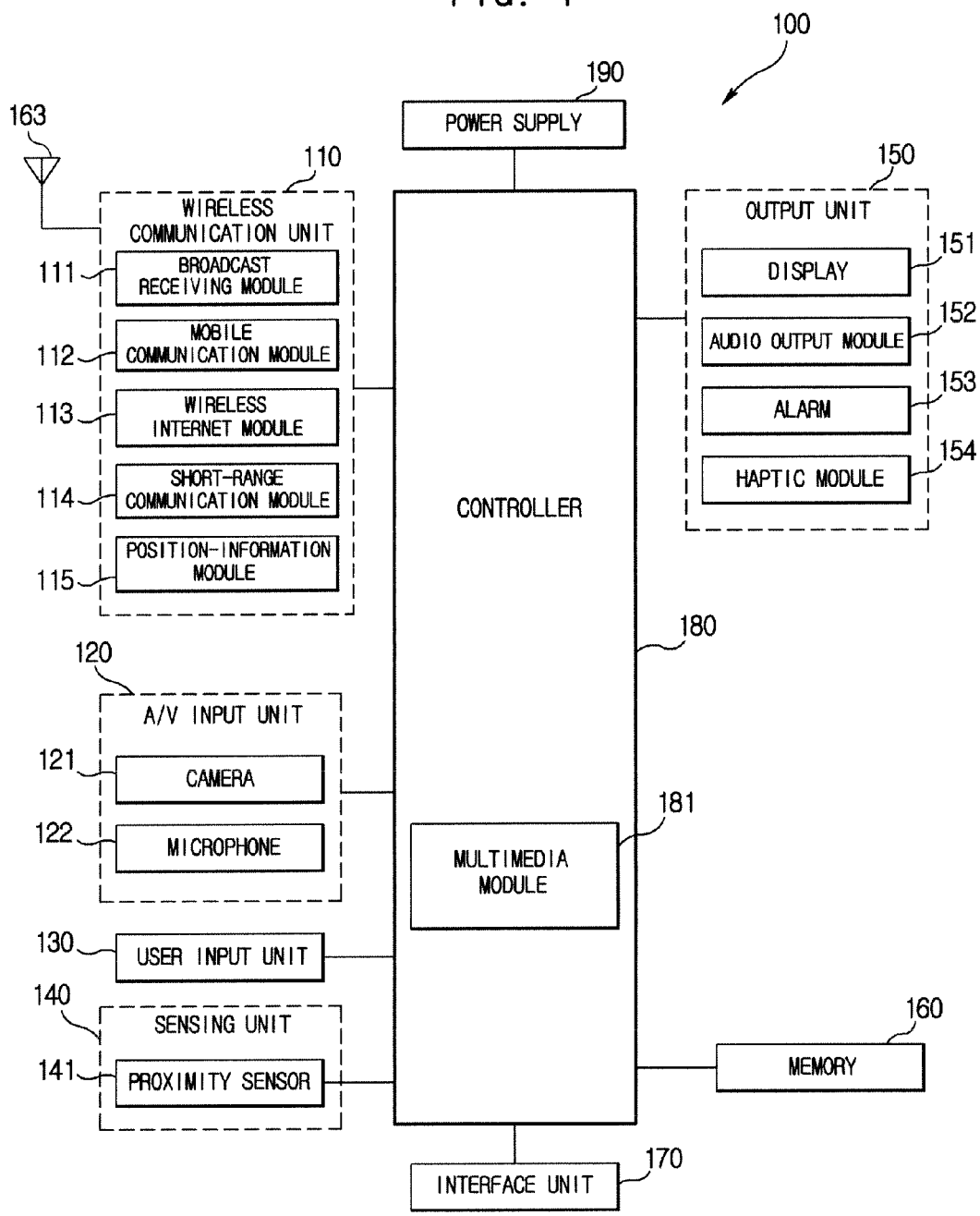
FIG. 1 is a block diagram of a mobile terminal in accordance with one embodiment of the invention.

The present invention relates to mobile terminals. In the following detailed description, reference is made to the accompanying drawing figures which form a part hereof, and which show by way of illustration specific embodiments of the invention. Wherever possible, the same reference numerals will be used throughout the drawings to refer to the same or similar parts.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

FIG. 1 is a block diagram of a mobile terminal 100 in accordance with one embodiment of the present invention. As shown in FIG. 1, the mobile terminal 100 includes a wireless communication unit 110, an audio/video (A/V) input unit 120, a user input unit 130, a sensing unit 140, an output unit 150, a memory 160, an interface 170, a controller 180, and a power supply 190. It should be understood that the mobile terminal 100 may include additional or fewer components than those shown in FIG. 1 without departing from the spirit and scope of the invention.

The wireless communication unit 110 includes one or more modules for allowing radio communication between the mobile terminal 100 and a radio communication system or a network in which the mobile terminal 100 is located. For example, the wireless communication unit 110 can include a broadcast receiving module 111, a mobile communication module 112, a wireless Internet module 113, a short-range communication module 114, and a position information module 115.

The broadcast receiving module 111 receives broadcast signals and/or information associated with a broadcast from an external broadcast management server, or other network entity, via a broadcast channel. The broadcast channel can include a satellite channel and/or a terrestrial channel. The broadcast management server can be a server that generates and transmits a broadcast signal and/or information associated with a broadcast, or a server that receives a previously generated broadcast signal and/or information associated with a broadcast and transmits the broadcast signal and/or information associated with a broadcast to a terminal.

For example, the broadcast signal can include a television broadcast signal, a radio broadcast signal, or a data broadcast signal. The broadcast signal can further include a broadcast signal combined with a television or radio broadcast signal.

The broadcast associated information can be information on a broadcast channel, a broadcast program or a broadcast service provider. The broadcast associated information can be provided even through a mobile communication network. In this case, the broadcast associated information can be received by the mobile communication module 112.

The broadcast associated information can take various forms. For example, the broadcast associated information can have the form of an electronic program guide (EPG) of the digital multimedia broadcasting (DMB) standard, or an electronic service guide (ESG) of the digital video broadcast-handheld (DVB-H) standard.

The broadcast receiving module 111 can be configured to receive signals broadcast by various types of broadcast systems. In particular, the broadcast receiving module 111 can receive a digital broadcast by using a digital broadcast system, such as digital multimedia broadcasting-terrestrial (DMB-T), digital multimedia broadcasting-satellite (DMB-S), the data broadcasting system known as media forward link only (MediaFLO®), digital video broadcast-handheld (DVB-H), or integrated services digital broadcast-terrestrial (ISDB-T) systems. The broadcast receiving module 111 is configured to be suitable for every broadcast system that provides a broadcast signal as well as the above-mentioned digital broadcast systems.

Broadcast signals and/or broadcast-associated information received via the broadcast receiving module 111 can be stored in a storage medium, such as the memory 160.

The mobile communication module 112 transmits and/or receives radio signals to and/or from at least one of a base station, an external terminal (e.g., other user devices), or a server (or other network entities) in a mobile communication network. Such radio signals can include a voice call signal, a video telephony call signal, or various types of data according to text and/or multimedia message transmission and/or reception.

The wireless Internet module 113 supports wireless Internet access for the mobile terminal 100. For example, the wireless Internet module 113 can be internally or externally coupled to the mobile terminal 100. The wireless Internet technology implemented by the wireless Internet module 113 can be a wireless local area network (WLAN), Wi-Fi, Wireless Broadband (WiBro), World Interoperability for Microwave Access (WiMAX), or High-Speed Downlink Packet Access (HSDPA).

The short-range communication module 114 is a module for supporting short-range or local area communication. For example, the short-range communication module 114 can be configured to communicate using short range communication technology, such as Bluetooth™, radio-frequency identification (RFID), Infrared Data Association (IrDA), Ultra-wideband (UWB), or ZigBee™.

The position information module 115 is a module for determining the position or location of the mobile terminal 100. For example, the position information module 115 can include a global positioning system (GPS) module (not shown in FIG. 1).

As shown in FIG. 1, the A/V input unit 120 in FIG. 1 can include an image capture device, such as a camera 121, and a device for detecting sounds, such as microphone 122. For example, the camera 121 can process image data of still pictures or video obtained via an image sensor of the camera 121 in a video telephony or photo capture mode of the mobile terminal 100. The processed image frames can be displayed on a visual output device, such as the display unit 151.

The image frames processed by the camera 121 can be stored in the memory 160 or other storage medium, or transmitted via the wireless communication unit 110. Other embodiments of the mobile terminal 100 can include more than one camera 121.

The microphone 122 can receive sounds or audible data in a phone call mode, a recording mode, or a voice recognition mode, and can process such sounds into audio data. For example, when the mobile terminal 100 is in a phone call mode, the audio data can be appropriately converted using techniques known in the art for transmission to a mobile communication base station via the mobile communication module 112. The microphone 122 can include various types of noise canceling or suppression algorithms for removing any undesirable noise in the received sounds.

The user input unit 130 can be a user input device configured to generate key input data from commands entered by a user to control various operations of the mobile terminal 100. For example, the user input unit 130 can include a keypad, a dome switch, a jog wheel, a jog switch, and/or a touch sensor, such as a touch sensitive member that detects changes in resistance, pressure, voltage, or capacitance. The user input 130 can include, for example, a first user input 131 and a second user input 132, which are described below with reference to FIG. 2A.

The sensing unit 140 generates commands or signals for controlling operations of the mobile terminal 100 in response to a detection of at least one status of the mobile terminal 100. For example, the sensing unit 140 can detect a current status or state of the mobile terminal 100, such as opened or closed state, the relative positions of the components of the mobile terminal 100, such as the positions of the display unit 151 and the user input unit 130, the absence or presence of user contact with the mobile terminal 100, the orientation of the mobile terminal 100, or an acceleration or deceleration of the mobile terminal 100.

For example, when the mobile terminal 100 is implemented as a slide type mobile phone, the sensing unit 140 may sense whether the phone is opened or closed. Furthermore, the sensing unit 140 can be configured to detect whether the power supply 190 supplies power and whether the interface 170 is connected to an external device. In one embodiment, the sensing unit 140 can include a proximity sensor.

The output unit 150 can be configured to generate a visual, an auditory, and/or a tactile output. The output unit 150 can include, for example, the display unit 151, an audio output module 152, an alarm 153, and a haptic module 154.

The display unit 151 can include a liquid crystal display (LCD), a thin film transistor liquid crystal display (TFT-LCD), an organic light-emitting diode (OLED) display, a flexible display, or a three-dimensional (3D) display. In one embodiment, the display unit 151 includes one or more of the abovementioned displays.

The display unit 151 can display information processed in the mobile terminal 100. For example, when the mobile terminal 100 is in a phone call mode, the display unit 151 can display a user interface (UI) or a graphic user interface (GUI) associated with placing, conducting, and terminating a telephone call or other communication. For example, if the mobile terminal 100 is in a video call mode or a photography mode, the display unit 151 may additionally or alternatively display images which are associated with such modes, or which are associated with the UI or the GUI.

In one embodiment, the display 151 can be configured as a transparent display, such as a transparent organic light emitting diode (TOLED) display or a transparent liquid crystal display. For example, the display unit 151 and/or the mobile terminal 100 can include translucent materials to allow a user to see through both the display unit 151 and the mobile terminal 100.

In other embodiments, the mobile terminal 100 can include one or more display units in addition to display unit 151. The display units can be arranged, for example, on one side of the mobile terminal 100 at a predetermined location or on different sides of the mobile terminal 100. For example, the mobile terminal 100 can include one or more displays that are formed in a single body or unit.

When the display unit 151 and the touch sensor are overlaid in a layered manner to form a touch screen (also referred to herein as a touch screen 151), the display unit 151 can function both as an input device and an output device. For example, the touch sensor can include a touch film, a touch sheet, or a touch pad.

The touch sensor can be configured to convert a change in pressure or capacitance at a portion of the display unit 151 into an electric input signal. For example, the touch sensor can be configured to sense an amount of pressure applied by the touch as well as the location and area of touch.

When a touch input is applied to the touch sensor, a signal corresponding to the touch input is transmitted to a touch controller. The touch controller processes the signal and transmits data corresponding to the processed signal to the controller 180, thereby allowing the controller 180 to detect the touched portion of the display 151.

Referring to FIG. 1, the proximity sensor 141 can be located within the mobile terminal 100, within the abovementioned touch screen 151, or near the touch screen 151. The proximity sensor 141 is a sensor configured to sense the presence or absence of an object relative to a detection surface or an object located nearby. The proximity sensor 141 performs detection without physical contact by using the force of electromagnetism or infrared rays. The proximity sensor 141 has a longer life span than a contact type sensor, and can be used for various purposes.

The proximity sensor 141 can include, for example, a transmission type photo-electric sensor, a direct reflection type photo-electric sensor, a mirror-reflection type photo-electric sensor, a radio frequency oscillation type proximity sensor, an electrostatic capacitive proximity sensor, a magnetic proximity sensor, or an infrared proximity sensor. In one embodiment, an electrostatic capacitive touch screen can be configured to detect the absence or presence of a pointer via a variation in an electric field caused by the proximity of the pointer to the capacitive touch screen. In such an embodiment, the electrostatic capacitive touch screen can be referred to as a proximity sensor.

For purposes of clarity, recognition of the location of the pointer when the pointer is positioned close to the touch screen 151 without actually contacting the touch screen 151 will be herein referred to as a "proximity touch," while recognition of the pointer when the pointer is actually in contact with the touch screen 151 will be herein referred to as a "contact touch." The location on the touch screen 151 at which a proximity touch is achieved corresponds to the location of the pointer in a perpendicular direction above the touch screen 151.

Via the proximity sensor 141, a proximity touch and a proximity touch pattern, such as a proximity touch distance, a proximity touch time, a proximity touch position, or a proximity touch shift state can be detected. For example, information corresponding to the detected proximity touch action and proximity touch pattern can be displayed on the touch screen 151.

The audio output module 152 can convert and output audio data received from the wireless communication unit 110, or stored in the memory 160, in a call signal receiving mode, a call mode, a record mode, a speech recognition mode, or a broadcast receiving mode. The audio output module 152 may also provide audile outputs related to a particular function performed by the mobile terminal 100, such as a call signal reception sound or a message reception sound. For example, the audio output module 152 can include a receiver, a speaker, a buzzer, or other audio producing device.

The alarm 153 may provide outputs to indicate the occurrence of an event in the mobile terminal 100. For example, the events can include call reception, message reception, a key signal input, or a touch input. In addition to video signals or audio signals, the alarm 153 can provide outputs in a different manner to indicate the occurrence of an event. For example, the alarm 153 can provide outputs in the form of vibrations, or other tactile or sensible outputs. The video and audio signals can be output via the display unit 151 and the audio output module 152. In one embodiment, the display unit 151 and the audio output module 152 are included in the alarm unit 153.

The haptic module 154 generates various tactile effects that can be physically sensed by the user. For example, a haptic effect generated by the haptic module 154 can include a vibration. The intensity and pattern of the vibration generated by the haptic module 154 can be controlled. For example, different vibrations can be combined and provided or sequentially provided.

The haptic module 154 can generate a variety of tactile effects in addition to vibration. For example, the haptic module 154 generates a stimulation caused by an arrangement of vertically moving pins that are in contact with the skin of the user, and in particular with the face of the user; a stimulation caused by an injection of air through an air hole or a suction of air through a suction hole; a stimulation caused by rubbing of the user's skin; a stimulation caused by contact with an electrode; a stimulation cause by an electrostatic force; and a stimulation caused by the application of cold and warm temperatures using an element capable of absorbing or radiating heat in addition to vibrations.

The haptic module 154 can not only transmit haptic effects through direct contact but can also allow the user to feel haptic effects via kinesthetic sense of her fingers or arms. For example, the mobile terminal 100 can include at least two haptic modules 154.

The memory 160 can store software programs that are used for the processing and operations performed by the controller 180, or data, such as a phone book, contact data, a message, a still image, a video, or audio data. The memory 160 can further store a recent use history or a cumulative use frequency of each data, such as the frequency of use of the phonebook, each message, or each multimedia. The memory 160 can store data related to various patterns of vibrations and audio signals for output when a touch input is applied to the touch screen 151.

For example, the memory 160 can include at least one type of storage medium, such as a flash memory, a hard disk, a multimedia card, a micro type memory, a card type memory, such as a Secure Digital (SD) card, a random access memory (RAM), a static random access memory (SRAM), a read-only memory (ROM), a programmable ROM (PROM), an erasable programmable read-only memory (EPROM), an electrically erasable programmable read-only memory (EEPROM), magnetic memory, a magnetic disk, and an optical disk. In other embodiments, the memory 160 can be a network storage device that can be accessed by the mobile terminal 100 via a network connection. For example, the memory 160 can be accesses by the mobile terminal 100 via the Internet.

The interface 170 serves as an interface via which at least one external device can be connected to the mobile terminal 100. The interface 170 can be used to receive inputs, such as data, and/or power from an external device and to transmit the data or power to one or more elements within the mobile terminal 100. The interface 170 can also be used to transfer data between the mobile terminal 100 and an external device.

The interface 170 in FIG. 1 can include, for example, a wired or wireless headset port, an external power supply port or a battery charger port, a wired or wireless data port, a memory card port, a port for connecting a device having an identity module, an audio input/output (I/O) port, a video I/O port, and/or an earphone port.

The identity module can be an element with memory or storage capabilities, such as a memory chip, configured to store various types of information for authenticating a user's authority to use the mobile terminal 100. For example, the identification module can include a user identify module (UIM), a subscriber identify module (SIM), and a universal subscriber identify module (USIM). For example, the identification module can be integrated into an identification device, such as a smart card. Accordingly, the identification device can be connected to the mobile terminal 100 via a port of the mobile terminal 100.

In addition, when the mobile terminal 100 is connected with an external cradle, the interface 170 can serve as a conduit to allow power from the cradle to be supplied to the mobile terminal 100, or can serve as a conduit to allow various command signals to be transmitted to the mobile terminal 100. Various command signals or power provided by the cradle can operate as a signal for recognizing when the mobile terminal is properly mounted on the cradle.

The controller 180 controls the general operations of the mobile terminal 100. For example, the controller 180 can be a microprocessor configured to perform control and processing associated with voice communication, data communication, and video telephony. The controller 180 can perform a pattern recognition processing to recognize a character or image from a handwriting input or a picture-drawing input performed on the touch screen 151.

The controller 180 can include a multimedia module 181 for reproducing or playing back multimedia data. The multimedia module 181 can be integrated into the controller 180 or may be external to the controller 180.

The power supply 190 receives external power, via a power cable connection, or internal power, via a battery of the mobile terminal. The power supply unit supplies power required for operating respective elements and components under the control of the controller 180.

The various components described herein can be implemented in a computer-readable medium using, for example, computer software, hardware, or any combination thereof.

For example, the components described herein can be implemented in hardware using application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform the functions described herein. In other embodiments, such components can be implemented by the controller 180.

For example, the procedures or functions described herein can be implemented in software using separate software modules, such as procedures and functions, each of which perform at least one of the functions or operations described herein. Software codes can be implemented by a software application or program written in any suitable programming language. The software codes can be stored in the memory 160 and executed by the controller 180.

Figure 2A:
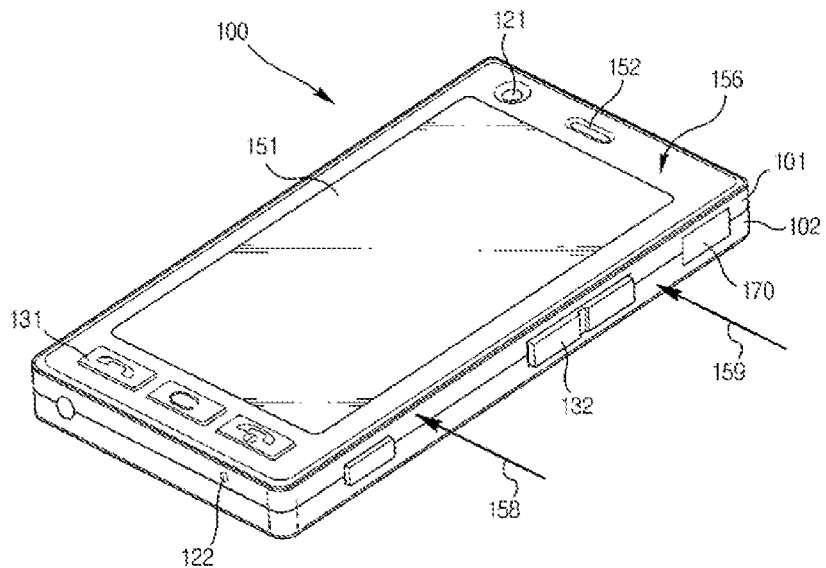
FIG. 2A is a front perspective view of a mobile terminal in accordance with one embodiment of the invention.

FIG. 2A is a front perspective view of the mobile terminal 100 in accordance with one embodiment of the present invention.

In FIG. 2A, the mobile terminal 100 is shown to have a bar type body. However, it should be understood that the mobile terminal 100 is not limited to a bar type body and can have a body type including at least two or more bodies that can move relative to one another, such as a slide type body, folder type body, rotational type body, swing type body, and a swivel type body.

The case of the mobile terminal 100, otherwise referred to as a "casing," "housing," or "cover," constituting the exterior of the mobile terminal 100, can include a front case 101 and a rear case 102. Various electronic components are installed in the space between the front case 101 and the rear case 102. One or more intermediate cases can be additionally disposed between the front case 101 and the rear case 102. For example, the front case 101 and the rear case 102 can be made by injection-molding of synthetic resin or can be made of a metallic material, such as stainless steel (STS) or titanium (Ti).

The display unit 151, the audio output unit 152, the camera 121, the first user input unit 131, the second user input unit 132, the microphone 122, or the interface 170 can be situated on the mobile terminal 100, and specifically, on the front case 101.

As shown in FIG. 2A, for example, the display unit 151 can be configured to occupy a substantial portion of the front face 156 of the front case 101. As also shown in FIG. 2A, the audio output unit 152 and the camera 121 can be arranged in proximity to one end of the display unit 151, and the first user input unit 131 and the microphone 122 can be located in proximity to another end of the display unit 151. As further shown in FIG. 2A, the second user input unit 132 and the interface 170 are arranged on the sides of the front case 101 and the rear case 102, such as sides 158 and 159, respectively.

The user input unit 130 (not shown in FIG. 2A) described above with respect to FIG. 1 can be configured to receive commands for controlling the operation of the mobile terminal 100 and can include one or more user inputs, such as the first user input 131 and the second user input 132 shown in FIG. 2A. The first user input unit 131 and the second user input unit 132 can each be referred to as a "manipulation unit." The manipulation unit can be configured to use various methods and techniques of tactile manipulation and response to facilitate operation by the user.

The first user input unit 131 and the second user input unit 132 can be configured to receive various inputs. For example, the first user input unit 131 can be configured to receive a start command, an end command, and a scroll command, and the second user input unit 132 can be configured to receive a volume control command for controlling the sound output from the audio output unit 152, or a mode change command to change the mode of the display unit 151 to a touch recognition mode.

Figure 2B:
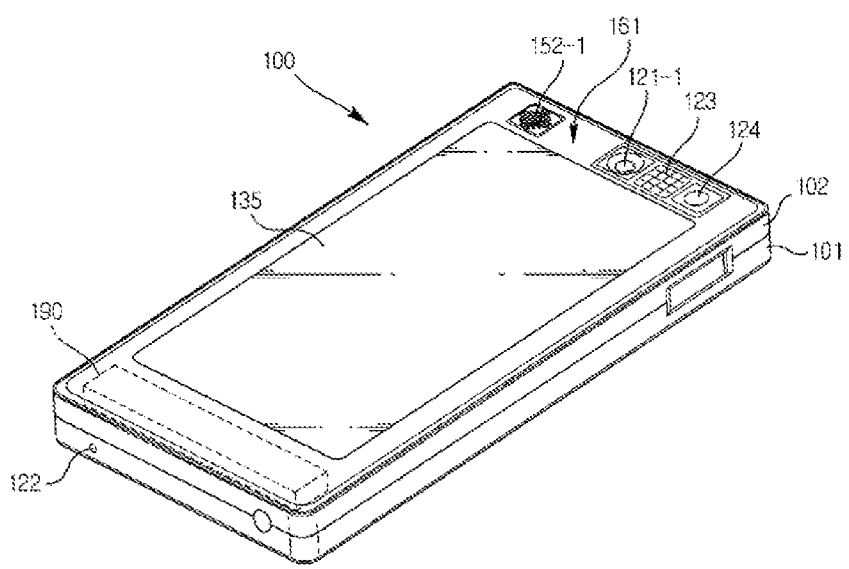
FIG. 2B is a rear perspective view of a mobile terminal in accordance with one embodiment of the invention.

FIG. 2B is a rear perspective view of the mobile terminal 100 in accordance with one embodiment of the present invention.

As shown in FIG. 2B, a camera 121-1 or other image capture device can be located on a rear surface 161 of the rear case 102. The camera 121-1 has a direction of view that is substantially opposite to the direction of view of the camera 121 shown in FIG. 2A.

For example, if the camera 121 is positioned to view the front of the mobile terminal 100, then the camera 121-1 is positioned to view the rear of the mobile terminal 100. The cameras 121 and 121-1 can have different resolutions, that is, different pixels counts, with respect to one another.

For example, the camera 121 can operate with a relatively lower resolution than the camera 121-1 in order to capture an image of the user to allow immediate transmission of the image to another user in real-time for video telephony, whereas the camera 121-1 can operate with a relatively higher resolution than the camera 121 to capture images of general objects with high picture quality, which may not require immediate transmission in real-time, but may be stored for later viewing or use. For example, the camera 121 and the camera 121-1 can be configured to rotate or to pop-up on the mobile terminal 100.

Additional camera related components, such as a flash 123 and a mirror 124, can be located adjacent to the camera 121-1. When an image of a subject is captured with the camera 121-1, the flash 123 illuminates the subject. The mirror 124 allows self-image capturing by allowing the user to see herself when the user desires to capture his own image using the camera 121-1.

The rear surface 161 of the rear case 102 can further include a second audio output unit 152-1. The second audio output unit 152-1 can support stereophonic sound functions in conjunction with the first audio output unit 152 shown in FIG. 2A and can be used for communication during a phone call when the mobile terminal 100 is in a speaker phone mode.

The broadcast receiving module 111 can include, for example, a broadcast signal receiving antenna (not shown in FIG. 2B) located at one side of the mobile terminal 100, in addition to antenna 163 shown in FIG. 1 used for mobile telephone communications. For example, the broadcast signal receiving antenna can be configured to be retractable from the mobile terminal 100.

FIG. 2B shows the power supply 190 for providing power to the handheld terminal 100. For example, the power supply 190 can be situated either inside the mobile terminal 100 or detachably coupled to an external portion of the mobile terminal 100.

As shown in FIG. 2B, a touch pad 135 for sensing a touch by the user can be located on the rear surface 161 of the rear case 102. In one embodiment, the touch pad 135 and the display unit 151 can be translucent. In such an embodiment, the information displayed on display unit 151 can be viewed through the touch pad 135. The information displayed on the display unit 151 and which can be viewed through the touch pad 135, can be controlled by the touch pad 135. In another embodiment, a display unit in addition to display unit 151 can be located on the rear surface 161 of the rear case 102 and combined with the touch pad 135 to form a touch screen 151 on the rear case 102.

In the embodiment shown in FIGS. 2A and 2B, the touch pad 135 located on the rear case 102 can be configured to allow manipulation by the user of items displayed on the display unit 151 located on the front case 101. For example, the touch pad 135 can be positioned substantially parallel to the display unit 151. For example, the touch pad 135 can have a size that is similar to a size of the display unit 151. In other embodiments, the touch pad 135 can have a different size relative to the display unit 151.

The interoperation between the display unit 151 and the touch pad 135 will now be described with reference to FIGS. 3A and 3B.

Figure 3A:
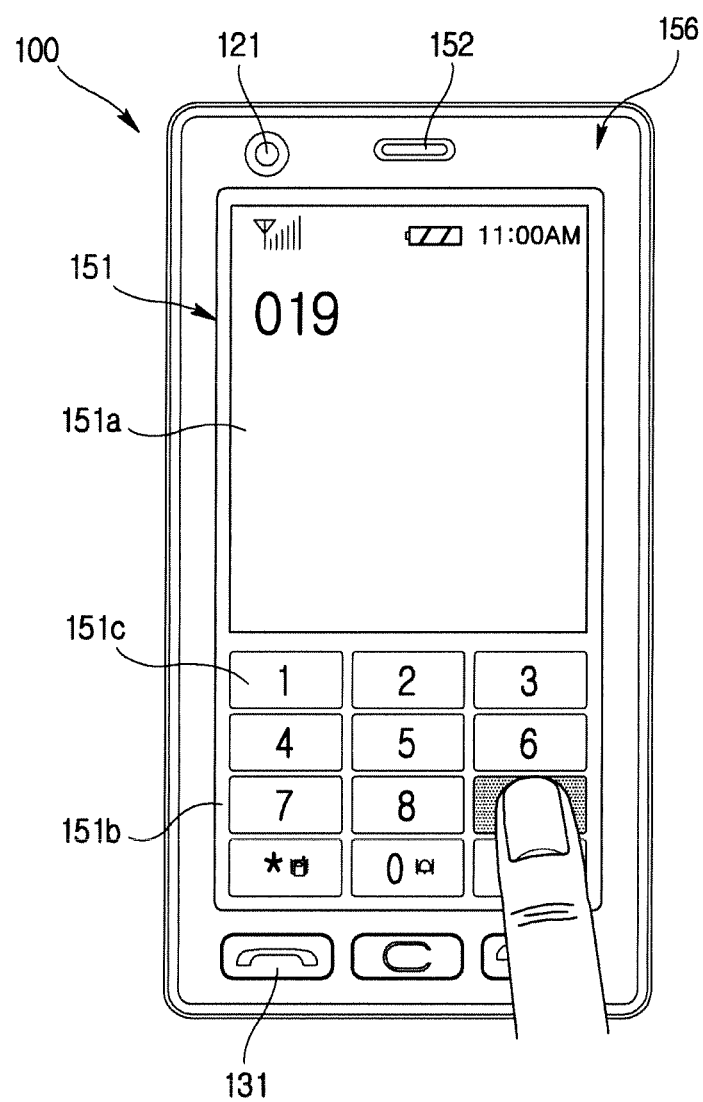
FIG. 3A shows a front view of a mobile terminal in a portrait orientation in accordance with one embodiment of the invention.

FIG. 3A shows a front view of the mobile terminal 100 in a portrait orientation in accordance with one embodiment of the present invention.

For example, the display unit 151 can be configured to display various types of information, such as characters, numerals, symbols, icons, and/or images. A user can input such information via a virtual keypad displaying an arrangement of at least a character, numeral, symbol, icon, or image on the display unit 151. Each key, such as key 151c, of the virtual keypad described above is also referred to in the art as a "soft key."

As shown in FIG. 3A, a user can input a character by touching a soft key on the display unit 151 located on the front surface 156 of the front case 101.

In one embodiment, the entire area of the display unit 151 can be configured to perform a single function. In other embodiments, two or more portions of the display unit 151 can be configured to perform different functions. In such an embodiment, the two or more portions of the display unit 151 can be configured to interoperate with one another.

For example, and as shown in FIG. 3A, an upper portion of the display unit 151 is configured as an output window 151a and a lower portion of the display unit 151 is configured as an input window 151b. As also shown in FIG. 3A, the input window 151b can display an arrangement of one or more soft keys, such as soft key 151c. For example, when a soft key in input window 151b is touched by a user, a character, number, or other input corresponding to the touched soft key can be displayed on the output window 151a.

As shown in FIG. 3A, for example, the soft keys in input window 151b can each represent a numeral which can be used by a user to input a telephone number. When the user operates the first input unit 131, for example, the mobile terminal 100 can attempt to place a call to the telephone number displayed on the output window 151a.

FIG. 3B shows a front view of the mobile terminal 100 in a landscape orientation in accordance with one embodiment of the present invention.

As shown in FIG. 3B, the mobile terminal 100 can be configured to convert the orientation of the displayed image in display unit 151 according to the current orientation of the mobile terminal 100.

As shown in FIG. 3B, the mobile terminal 100 can be configured to operate in a text input mode. As shown in FIG. 3B, the display unit 151 can display an output window 151a-1 and an input window 151b-1. As further shown in FIG. 3B, one or more soft keys, such as soft key 151c-1, that corresponds to at least one of a character, symbol, or numeral can be arranged in the input window 151b-1. As further shown in FIG. 3B, the one or more soft keys can be arranged in a QWERTY configuration. Other embodiments of the mobile terminal 100 can include a different configuration of the one or more soft keys.

For example, when a user operates a soft key, such as soft key 151c-1, by touching the soft key via the touch pad 135 located at the rear of the mobile terminal 100, a character, numeral, or symbol corresponding to the touched soft key can be displayed on the output window 151a-1. It can be appreciated that by allowing a user to operate the soft keys via the touch pad 135 at the rear of the mobile terminal 100, the mobile terminal 100 prevents a user from obstructing a view of the soft keys displayed in input window 151b-1 by the user's hands, thereby greatly improving the user's efficiency when inputting data. When the display unit 151 and the touch pad 135 are both either translucent or transparent, the user can see his own fingers located behind the mobile terminal 100 through the display unit 151 and the touch pad 135, and thus can accurately guide his fingers to the desired soft keys to correctly and efficiently operate the soft keys.

In one embodiment, the display unit 151 or the touch pad 135 can be configured to operate a scroll command in response to a touch input by the user. For example, the user can scroll the display unit 151 or the touch pad 135 to move an object displayed in the display unit 151, such as a cursor or a pointer located on an icon. In another embodiment, when a user moves his finger across the display unit 151 or the touch pad 135, the path of the user's finger can be visually displayed on the display unit 151 to facilitate various operations and functions of the mobile terminal 100, such as image editing.

For example, in an embodiment where the display unit 151 is configured as a touch screen, if the display unit 151 and the touch pad 135 are simultaneously touched by the user for a predetermined period of time, such as when the user clamps the mobile terminal 100 between his thumb and index finger, a function of the mobile terminal 100 can be executed. For example, the function can be an activation or deactivation of the display unit 151 or the touch pad 135.

The proximity sensor 141 will now be described in greater detail with reference to FIG. 4.

Figure 4:
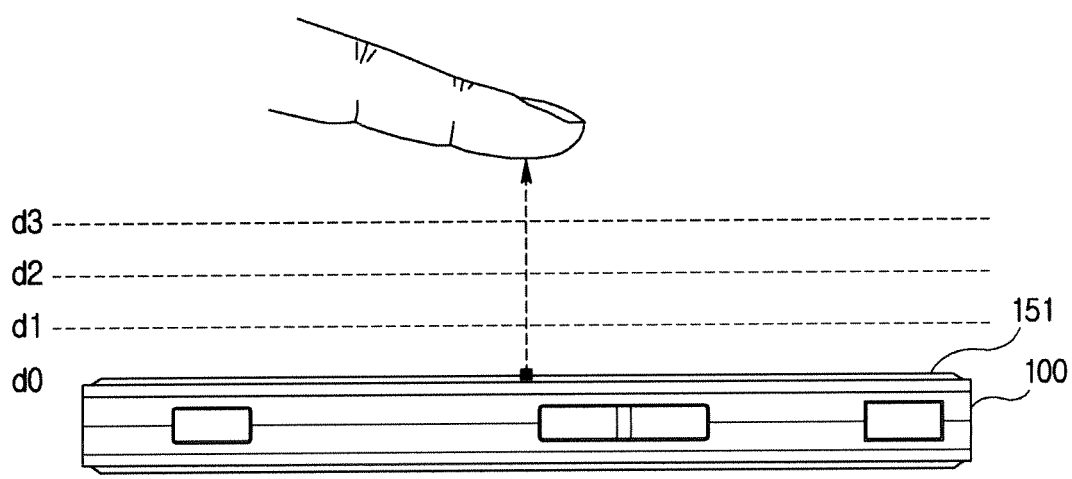
FIG. 4 shows a side view of a mobile terminal in accordance with one embodiment of the invention.

FIG. 4 shows a side view of the mobile terminal 100 in accordance with one embodiment of the present invention.

As shown in FIG. 4, when a pointer, such as a user's finger or stylus, approaches the touch screen 151, that is, display unit 151, the proximity sensor 141 located inside or near the touch screen 151 senses the approach of the pointer and provides a proximity signal.

The proximity sensor 141 can be configured to output a proximity signal indicating the distance between the pointer and the touch screen 151. Such a distance is also referred to in the art as a "proximity depth."

The exemplary mobile terminal 100 shown in FIG. 4 is configured to detect three proximity depths, such as proximity depths d1, d2, and d3, where each proximity depth represents the distance from the touch screen 151 to a location above the touch screen 151 in a substantially perpendicular direction above the touch screen 151. The relationships between the proximity depths d0, d1, d2, and d3 can be expressed as: $d0<d1<d2<d3$. It should be understood that in other embodiments, the mobile terminal 100 can be configured to include less than or greater than three proximity sensors to enable detection of any number of proximity depths.

For example, when a contact touch is performed, that is, when the pointer comes into contact with the touch screen 151, the proximity depth d0 is detected and it is recognized as a contact touch; when the pointer is located within the proximity depth d1 and the proximity depth d0, a proximity touch at the proximity depth d1 is recognized; when the pointer is located between the proximity depth d1 and the proximity depth d2, a proximity touch at the proximity depth d2 is recognized; when the pointer is located within the proximity depth d2 and the proximity depth d3, a proximity touch at the proximity depth d3 is recognized; when the pointer is located at a distance greater than the proximity depth d3, a cancellation or release of a proximity touch is recognized.

Accordingly, the controller 180 can recognize the proximity touch as proximity input signals according to the proximity depth and proximity position of the pointer with respect to the touch screen 151 and can perform various operations and controls according to the provided proximity input signals.

Figure 5A:
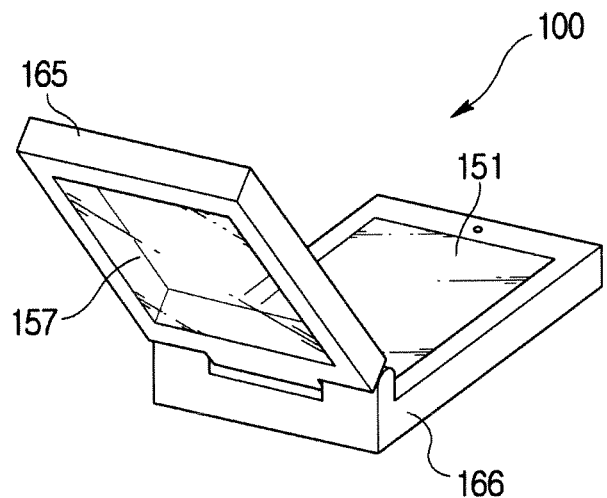
FIG. 5A is a perspective view of a folder-type implementation of a mobile terminal in an opened configuration including a first display unit and a second display unit configured to overlap the first display unit in accordance with one embodiment of the invention.

FIG. 5A is a perspective view of a folder-type implementation of the mobile terminal 100 in an opened configuration including the display unit 151 and the display unit 157 configured to overlap display unit 151 in accordance with one embodiment of the invention.

Figure 5B:
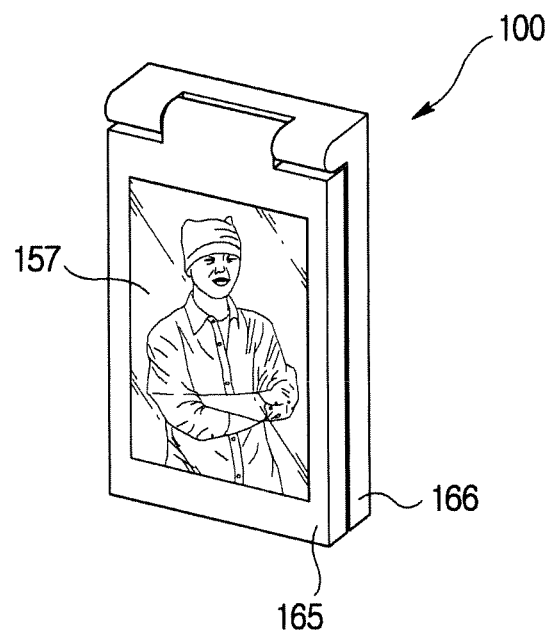
FIG. 5B is a perspective view of a folder-type implementation of a mobile terminal in a closed configuration showing a display unit in accordance with one embodiment of the invention.

FIG. 5B is a perspective view of a folder-type implementation of the mobile terminal 100 in a closed configuration showing the display unit 157 in accordance with one embodiment of the invention.

As shown in FIGS. 5A and 5B, the mobile terminal 100 has a folder portion 165 coupled to the main body portion 166 such that the folder portion 165 can be folded to achieve a closed configuration of the mobile terminal 100 and unfolded to achieve an opened configuration of the mobile terminal 100.

The display unit 157 located in the folder portion 165 can be either a translucent or transparent type of display unit, such as a transparent organic light emitting diode (TOLED) display or a transparent liquid crystal display, and the display unit 151 can be an LCD. In one embodiment, either or both of the display units 151 and 157 can be a touch screen.

Figure 5C:
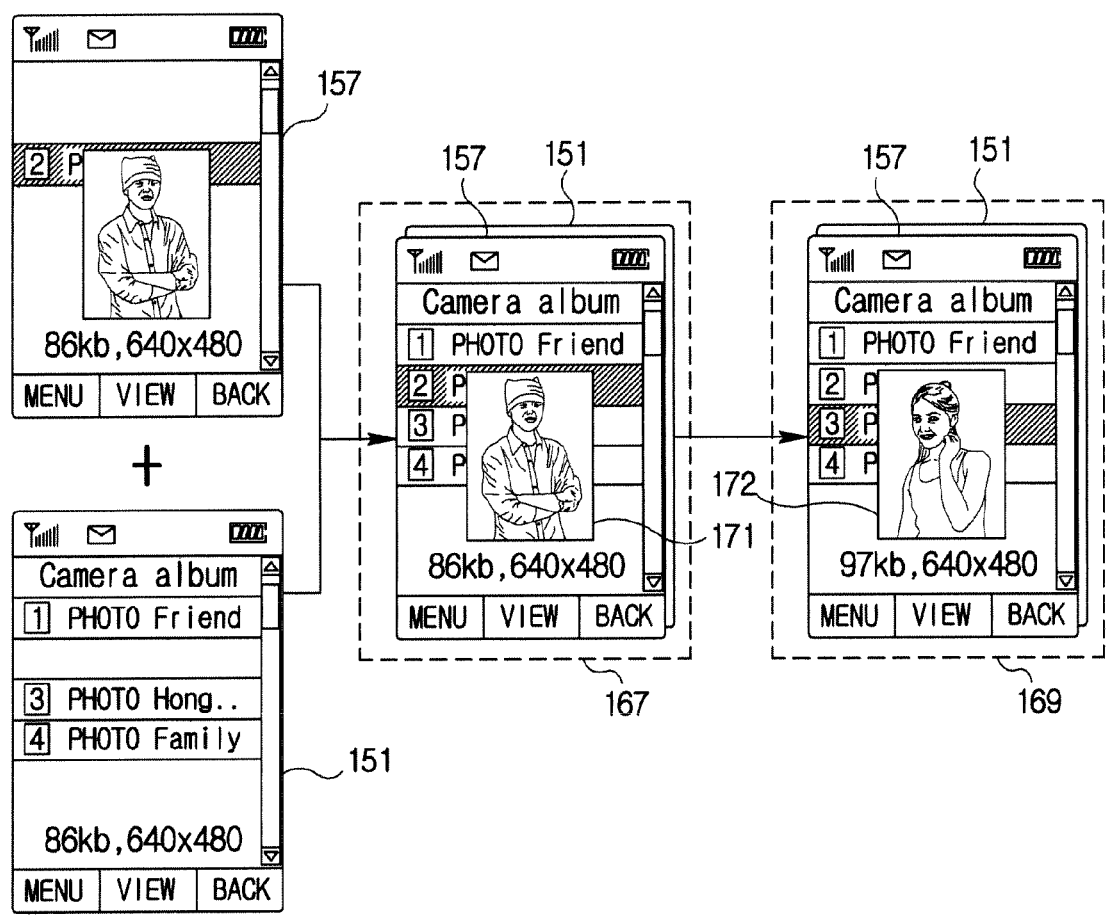
FIG. 5C shows a sequence of exemplary screens in accordance with one embodiment of the invention.

FIG. 5C shows a sequence of exemplary screens in accordance with one embodiment of the invention. As shown in FIG. 5C, the display unit 157 can display a first screen and the display unit 151 can display a second screen. Since the display unit 157 is configured as a translucent or a transparent display unit, the first and second screens can be viewed concurrently when the mobile terminal 100 is in the closed configuration. For example, as shown in region 167 of FIG. 5C, the display unit 157 can overlap the display unit 151 to allow the first and second screens to be viewed concurrently.

With reference to FIG. 5C, if a touch input performed on the display unit 157 is detected by the controller 180, the controller 180 can select or execute at least one image from an image list displayed on the display unit 151 according to the type and duration of the touch input. It should be understood that the terms "touch input" and "contact" as used herein can be a "proximity touch input" or a "contact touch input" described above.

A method of controlling the information displayed on the display unit 151 via touch inputs on the display unit 157 of the mobile terminal 100 will now be discussed. For example, a touch input can include a momentary touch input, an extended touch input, or an extended touch input with a drag operation.

In a closed configuration of the mobile terminal 100 where the display unit 157 overlaps the display unit 151, if a touch input for controlling an image on the display unit 157 other than a momentary touch input is detected by the controller 180, such as an extended touch input having a duration of at least two seconds, the controller 180 enables at least one image to be selected from an image list displayed on the display unit 157 according to the touch input.

Region 167 in FIG. 5C shows the result of displaying an exemplary selected image in the display unit 151, such that the selected image is shifted to the display unit 157. Region 169 in FIG. 5C shows the result of displaying another exemplary selected image in the display unit 151, such that the selected image is shifted to the display unit 157.

In one embodiment, the extended touch can be used to selectively shift one of the items displayed on the display unit 151 to the display unit 157, without executing a function corresponding to the item. In particular, if a user performs an extended touch on a prescribed region of the display unit 157 corresponding to an item in the display unit 151, the controller 180 can shift the item to the display unit 157.

In another embodiment, an item displayed in the display unit 157 can be shifted to the display unit 151 in response to various touch inputs performed on the display unit 157, such as a touch input including a flicking or a swirling motion.

For example, if a drag operation is detected in addition to an extended touch input, the controller 180 executes a function associated with an item selected by the extended touch input, such as displaying a preview image corresponding to the selected item in the display unit 157. For example, as shown in region 167 of FIG. 5C, a preview image 171 corresponding to the second item in the list of items labeled "Camera album" can be displayed in the display unit 157.

During the display of the preview image 171, if a drag operation is performed toward a different item in the display unit 157 while maintaining the extended touch, the controller 180 shifts a selection cursor or a selection bar in the display unit 151 and then displays a preview image corresponding to the item selected by the selection cursor in the display unit 157, such as the preview image 172 corresponding to the third item shown in the region 169. Upon termination of the extended touch with the drag operation, the controller 180 displays the initial image selected by the extended touch.

The features described above with respect to the extended touch with the drag operation can also be applied to an extended proximity touch with a slide operation. For example, an extended proximity touch is a proximity touch that is maintained for approximately 2 or 3 seconds. A slide operation is similar to a drag operation, except contact is not maintained with the display unit 157.

If a touch operation other than those described above are detected, the controller 180 can operate in the same manner of the general touch controlling method.

The method of controlling the touch operation when the mobile terminal 100 is in a closed configuration is applicable to a mobile terminal having a single display. Furthermore, the method of controlling the touch operation in the closed configuration is applicable to mobile terminals with dual displays having a configuration type other than the folder type.

Figure 6:
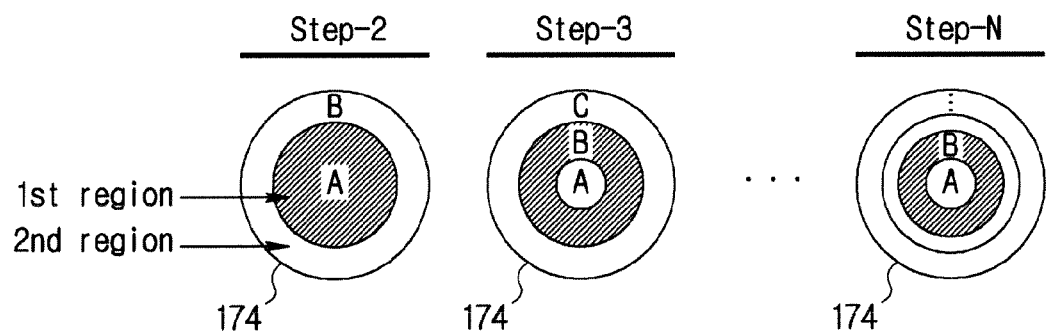
FIG. 6 shows an exemplary object having a circular shape.
Figure 7A:
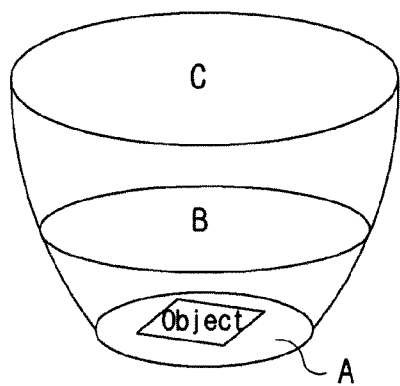
FIGS. 7A and 7B are diagrams describing a proximity touch recognition area and a tactile effect generation region.
Figure 7B:
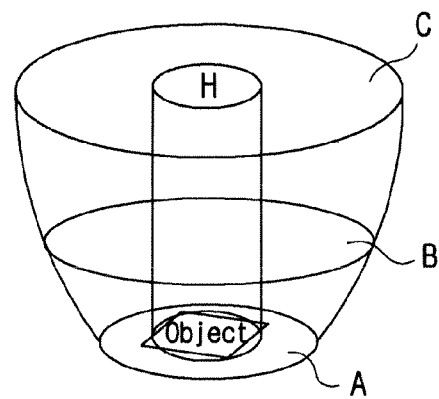

FIG. 6 and FIGS. 7A and 7B are diagrams describing a proximity touch recognition area and a tactile effect generation region.

FIG. 6 shows an exemplary object 174, which can be an icon or a menu item, having a circular shape for clarity and convenience of explanation.

A region for displaying an object, such as object 174, on the display unit 151 can be divided into a first region A at a central portion of the object and a second region B enclosing the first region A. The first and second regions A and B can be configured to generate tactile effects differing from each other in strength or pattern. For example, the first region A and the second region B can be configured to generate 2-step vibrations, such that a first vibration at a first intensity is output if the second region B is touched or a second vibration at a second intensity is output if the first region A is touched. In one embodiment, the second intensity is greater than the first intensity.

If the proximity touch recognition region and the haptic region are both located in the region where the object 174 is displayed, the controller 180 can set the haptic region for generating the tactile effect at a different location from the proximity touch recognition region for detecting the proximity signal. In one embodiment, the controller 180 can set the haptic region to be narrower or wider than the proximity touch recognition region. For example, as shown in the object 174 under "Step-2" in FIG. 6, the controller 180 can set the proximity touch recognition region to the area including both the first region A and the second region B and can set the haptic region to the first region A.

In one embodiment, the controller 180 can separate the region in which the object 174 is displayed into three regions, such as region A, region B, and region C as shown in object 174 under "Step-3" in FIG. 6. Alternatively, the controller 180 can separate the region in which the object 174 is displayed into N regions, where N is an integer greater than four, as shown in object 174 under "Step-N" in FIG. 6. For example, as shown in the object 174 under "Step-N" in FIG. 6, the controller 180 can configure each of the divided regions to generate a tactile effect having a different strength or pattern. Where a region includes a single object divided into at least three regions, the controller 180 can set the haptic region and the proximity touch recognition region to be different from on another according to a use environment.

In one embodiment, the controller 180 can configure a size of the proximity touch recognition region of the display unit 151 to vary according to a proximity depth. For example, with reference to FIG. 7A, the proximity touch recognition region can be configured to decrease according to the proximity depth for the display unit 151, as indicated by regions "C," "B," and "A." Alternatively, the proximity touch recognition region can be configured to increase according to the proximity depth for the display unit 151 as indicated by regions "C," "B," and "A." As shown in FIG. 7B, the controller 180 can set the haptic region to have a predetermined size, as indicated by the region "H" shown in FIG. 7B, regardless of the proximity depth for the display unit 151.

It should be understood that various schemes can be used for dividing a region in which an object is displayed for setting the haptic region or the proximity touch recognition region, such as horizontal/vertical division, radial division and combinations thereof as well as the concentric circle type division shown in FIGS. 6, 7A, and 7B.

In one embodiment, the mobile terminal 100 includes an Internet address input window showing an Internet address of an accessed Internet page, also referred to in the art as a "Web page," and a touch screen having a virtual key pad.

The controller 180 in the mobile terminal 100 can generate a duplicate window including the contents of the Internet address input window when the contents are touched and dragged; move the duplicate window in response to a drag operation; store the Internet address currently in the Internet address input window in response to a drop operation following the drag operation on a key in the virtual key pad; and assign an Internet address short-cut to the key.

When one or more keys in the virtual key pad have each been assigned an Internet address short-cut using the operations of the controller 180 described above, the controller 180 can display the one or more keys differently to enable identification of the one or more keys and to enable a user to distinguish the one or more keys from other keys which have not been assigned an Internet address short-cut. For example, the one or more keys that have been assigned an Internet address short-cut can be displayed with a thicker boundary than other keys which do not have a short-cut code.

In one embodiment, after one or more keys in the virtual keypad have each been assigned an Internet address short-cut, the controller 180 can display the Internet address assigned to a particular key in response to a proximity touch on the particular key in the virtual key pad. For example, an Internet address may be displayed in a bubble window.

In another embodiment, the controller 180 can display an Internet address assigned to another key, when a touch is performed on the another key in the virtual key pad.

In still another embodiment, the controller 180 can access, that is, display, an Internet address assigned to another key when a touch input is performed and maintained on the another key in the virtual key pad for a predetermined time.

According to one embodiment, a method of accessing the Internet using a mobile terminal includes a method for assigning an Internet address short-cut to one or more keys and a method for accessing the Internet address using the one or more keys which have been assigned an Internet address short-cut. In the method discussed herein for accessing the Internet using a mobile terminal, it should be understood that the method is performed by a mobile terminal, such as the mobile terminal 100, and more particularly by a controller in the mobile terminal, such as the controller 180.

In one embodiment, the controller 180 can assign an Internet address short-cut to a key by detecting a drag and drop operation performed on the contents of an Internet address input window and by detecting a key in a virtual keypad on which the drag and drop operation is performed. The controller 180 can then proceed by storing the Internet address displayed in the Internet address input window and assigning the Internet address short-cut to the detected key.

In one embodiment, the controller 180 detects the drag and drop operation by detecting a touch input in an area where the Internet address input window contents are displayed, detecting a movement of the touch input while the touch input is maintained, and moving a duplicate window that includes the Internet address input window contents.

In one embodiment, the controller 180 can display a window informing the user that an Internet address short-cut has been assigned to one or more keys.

FIGS. 8A through 8F show an exemplary sequence of screens displayed in the mobile terminal 100 which illustrate the assigning of an Internet address short-cut to a key in accordance with one embodiment of the invention.

Figure 8A:
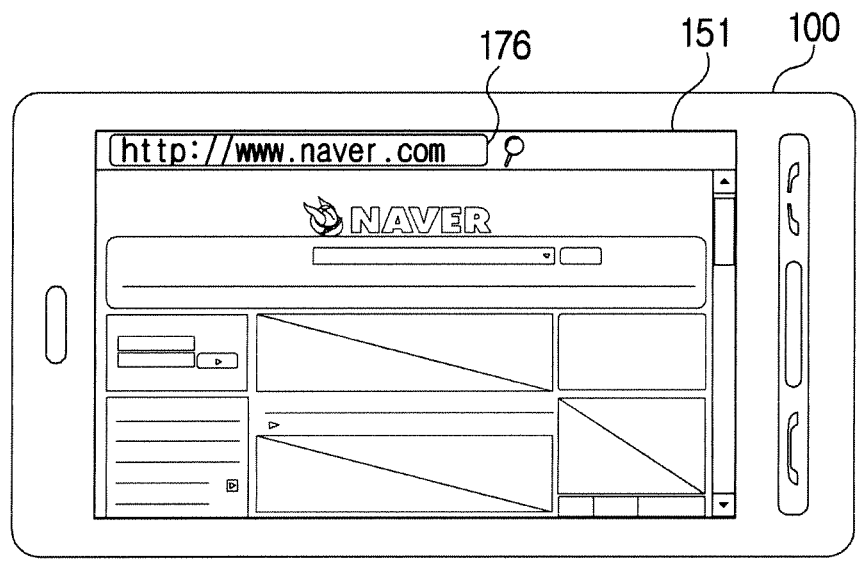
FIGS. 8A through 8F show an exemplary sequence of screens displayed in a mobile terminal which illustrate the assigning of an Internet address short-cut to a key in accordance with one embodiment of the invention.

As shown in FIG. 8A, the Internet address input window 176 which includes the currently accessed Internet address, is located at the top portion of the screen.

Figure 8B:
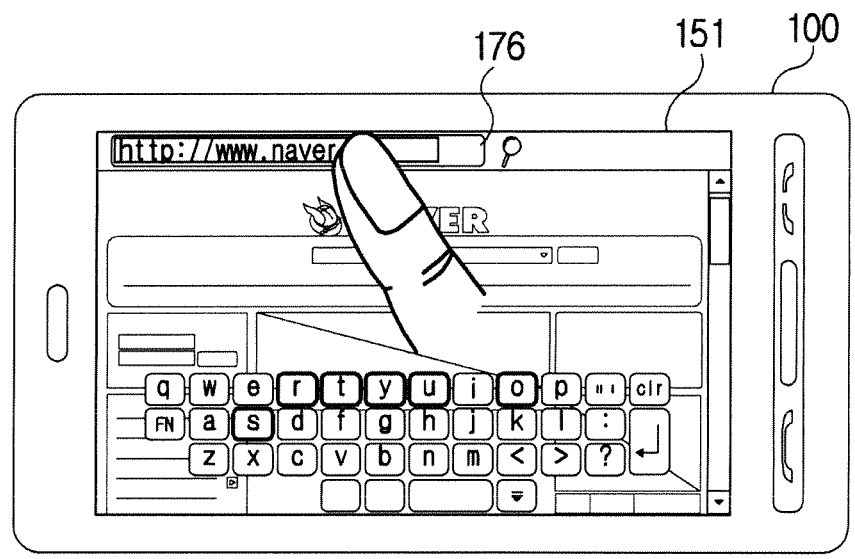

As shown in FIG. 8B, when a user provides a touch input to an area within the Internet address input window 176, the controller 180 displays a virtual key pad in the bottom of the screen.

Figure 8C:
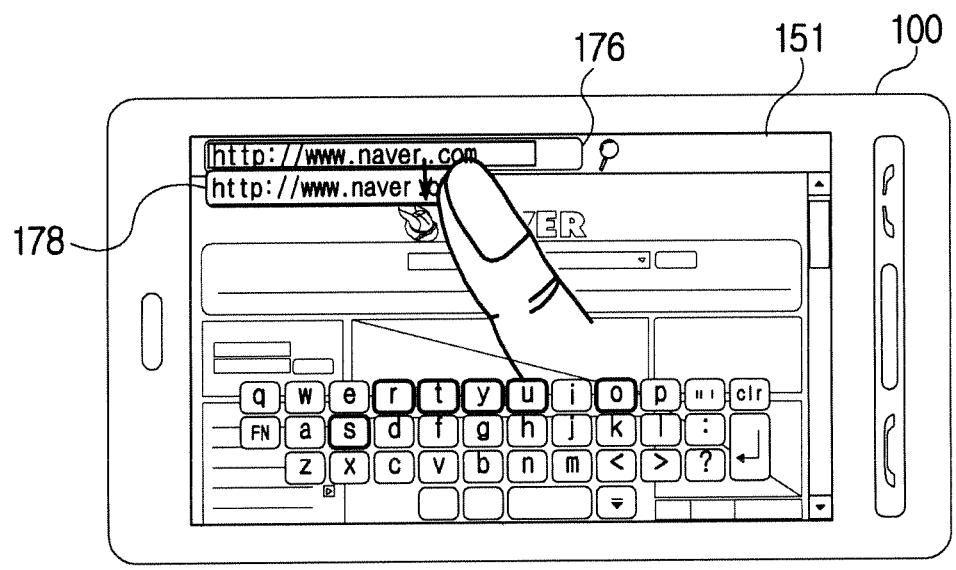

As shown in FIG. 8C, when the user performs a drag operation while maintaining the touch input to the Internet address input window 176, the controller 180 generates a duplicate window 178 including the contents of the Internet address input window 176.

Figure 8D:
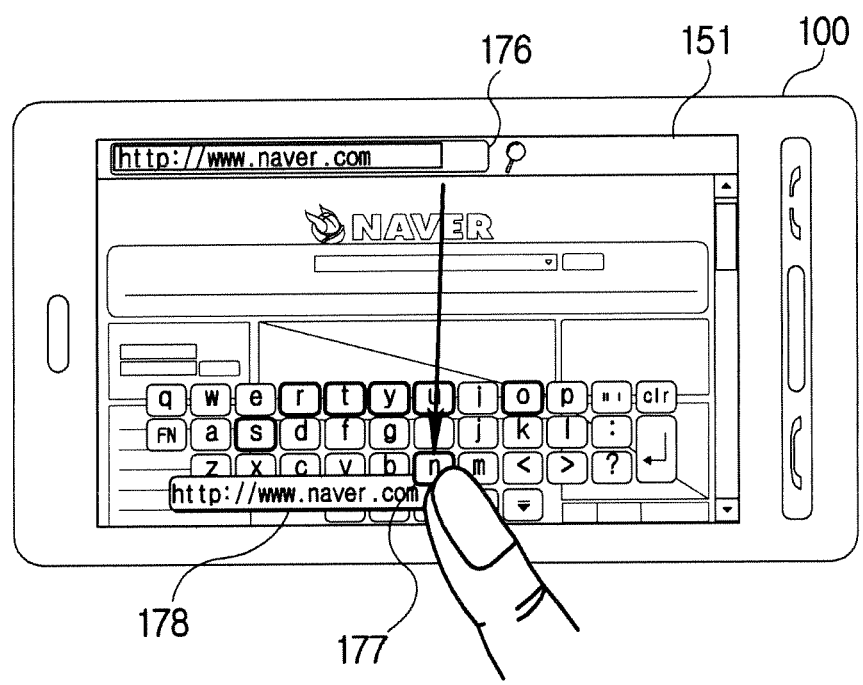

As shown in FIG. 8D, the user can drag the duplicate window 178 to a key in the virtual keypad, such as key 177 indicating the letter "n," and can perform a drop operation on the key. The controller 180 can assign an Internet address short-cut for the Internet address in the duplicate window 178 to the key.

Figure 8E:
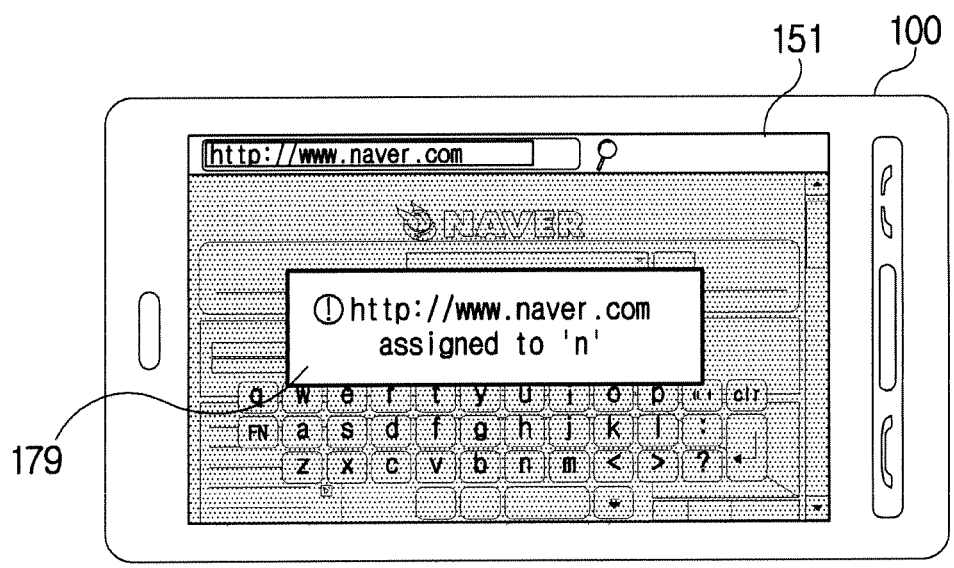

As shown in FIG. 8E, a message window 179 informing the user that the Internet address short-cut is assigned to one or more keys, such as the key 177 indicating the letter "n," is displayed in the display unit 151.

Figure 8F:
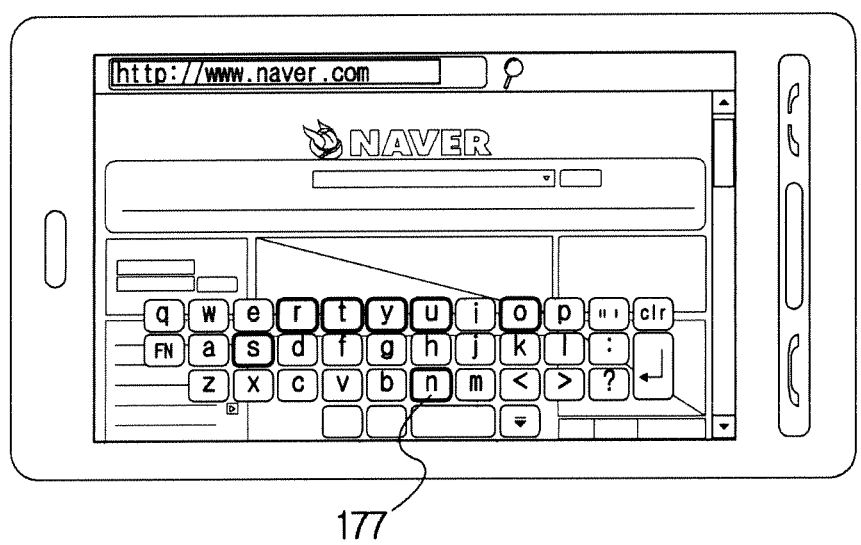

As shown in FIG. 8F, the keys which have been previously assigned an Internet address short-cut are displayed with a thicker boundary, that is, a boundary having increased line weight, relative to the other keys in order to allow a user to identify the keys which have been assigned an Internet address short-cut.

In one embodiment, the controller 180 can access an Internet page via an Internet address short-cut assigned to a key in the virtual key pad. For example, the controller 180 can access the Internet page by receiving a touch input on a key in the virtual key pad via a pointing device, displaying the Internet address assigned to the touched key in the Internet address input window, and displaying an Internet page corresponding to the displayed Internet address, if no signal is input during a predetermined time, such as approximately 0.5 seconds to 2 seconds, or if an "enter" or "go" key configured to execute a command in the mobile terminal 100 is operated.

In one embodiment, the controller 180 can receive a proximity touch input on a key in the virtual key pad via a pointing device and can display an Internet address assigned to the touched key.

FIGS. 9A through 9E show an exemplary sequence of screens displayed in the mobile terminal 100 for accessing an Internet page using an Internet address short-cut assigned to a key in accordance with one embodiment of the invention.

Figure 9A:
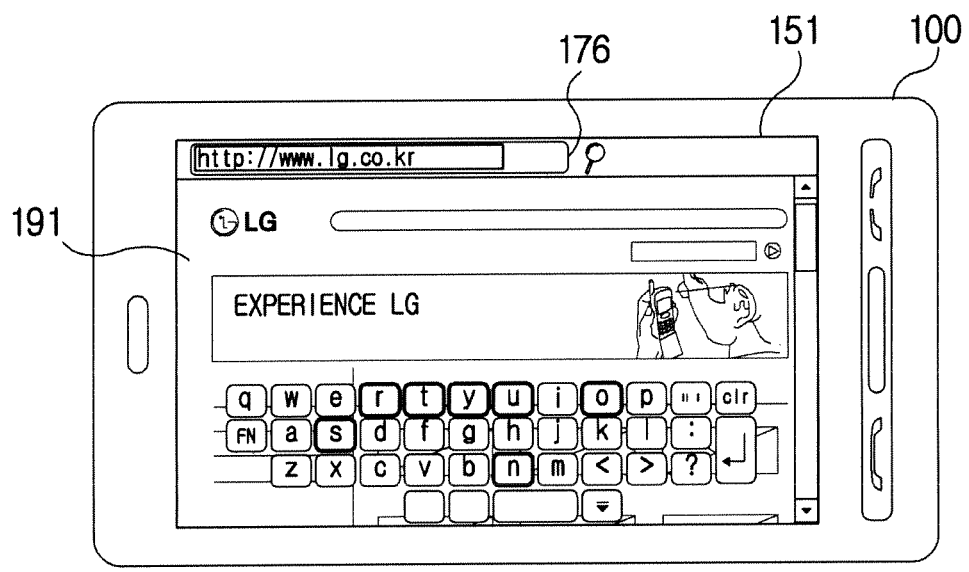
FIGS. 9A through 9E show an exemplary sequence of screens displayed in a mobile terminal for accessing an Internet page using an Internet address short-cut assigned to a key in accordance with one embodiment of the invention.

As shown in FIG. 9A, a virtual key pad is displayed over the contents of an Internet page 191 in the bottom portion of the display unit 151. Typically, while a user browses the Internet, the virtual key pad is not displayed over the contents of an Internet page. In one embodiment, the virtual key pad is displayed when a user desires to input an Internet address in the Internet address input window in response to a touching of the Internet address input window during the Web browsing.

Figure 9B:
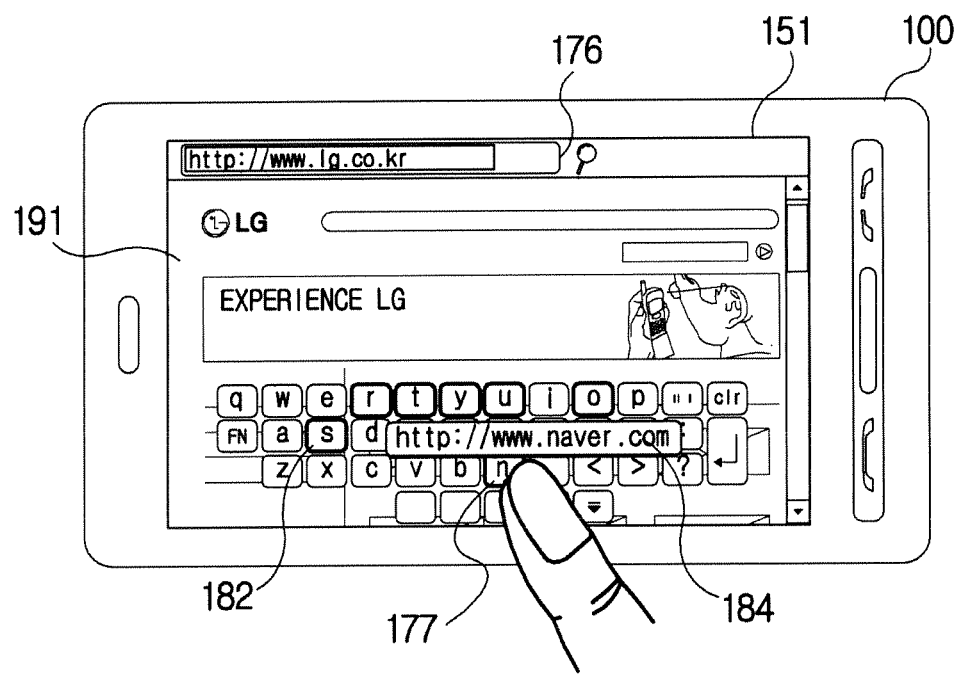

As shown in FIG. 9B, when the user performs a proximate touch on one of the keys in the virtual keypad, such as key 182 or key 177, which has been assigned an Internet address short-cut, the Internet address of the Internet address short-cut assigned to the touched key is displayed in the bubble window 184.

Figure 9C:
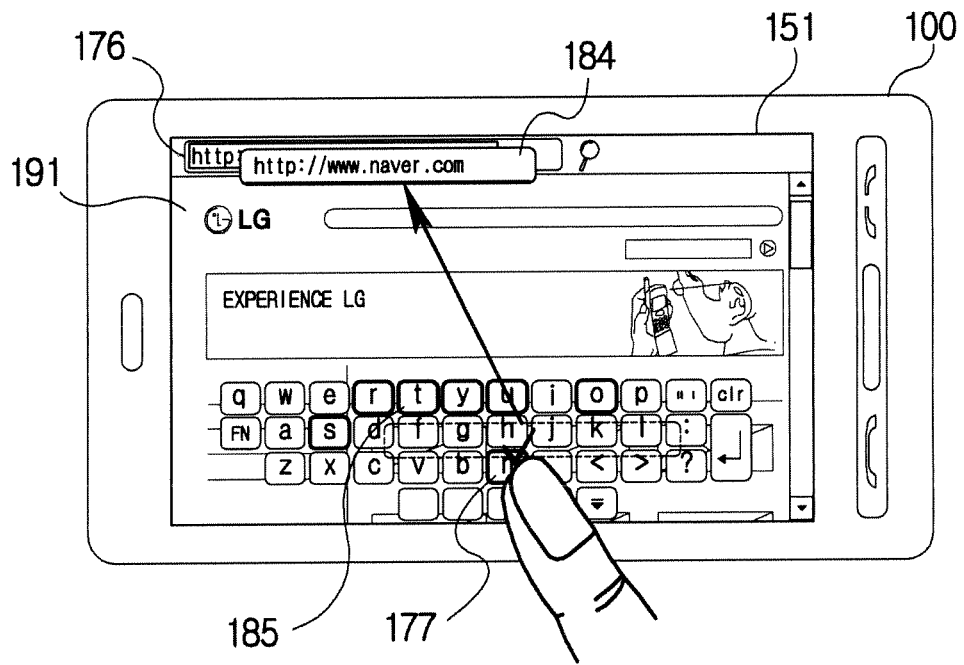

As shown in FIG. 9C, when the user performs a touch input via a pointing device, such as a stylus or the finger of the user, on one of the keys which was previously assigned an Internet address short-cut, such as key 185 or key 177, the controller 180 changes the contents of the Internet address input window 176 to the Internet address of the assigned Internet address short-cut. In other words, the controller 180 receives a touch input on a key in the virtual key pad via a pointing device and displays the Internet address of the Internet address short-cut assigned to the touched key in the Internet address input window 176.

In one embodiment, the current browsing screen is maintained except that the contents of the Internet address input window 176 are changed. For example, as shown the FIG. 9C, an animation can be used to visually display the bubble window 184 including the Internet address of the Internet address short-cut assigned to the key 177 moving to the Internet address input window 176.

Figure 9D:
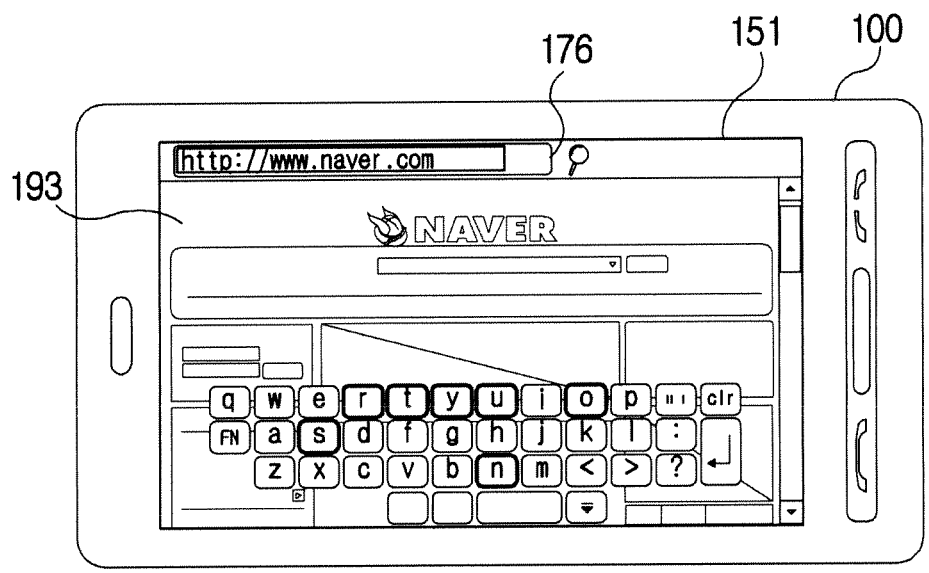

If no signal is input during a predetermined period, such as approximately 0.5 seconds to 2 seconds, or if an "enter" or "go" key configured to execute a command in the mobile terminal 100 is operated, the controller 180 displays the Internet page 193 corresponding to the Internet address in the Internet address input window 176, as shown in FIG. 9D.

Figure 9E:
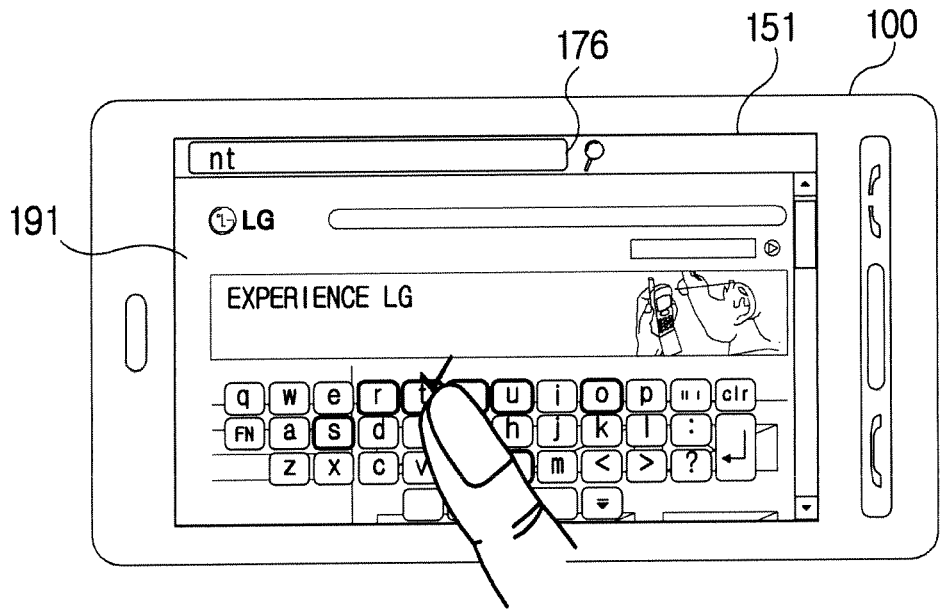

When the user immediately operates one of the keys in the virtual keypad, such as the key 177 indicating the letter "n" and the key 185 indicating the letter "t," the controller 180 determines that the user is manually entering an Internet address in the Internet address input window 176. The controller 180 allows the characters input by the user to be written in the Internet address input window 176, as shown in FIG. 9E.

In one embodiment, the controller 180 can access the Internet page using an Internet address short-cut assigned to a key by receiving a touch input performed on a key in the virtual key pad via a pointing device for predetermined time, and displaying an Internet page corresponding to an Internet address in an Internet address input window that was previously assigned to the key. The controller 180 can display the Internet address of the Internet address short-cut assigned to a touched or proximately touched key, in response to a touch input performed with a pointing device on the key in the virtual key pad.

The controller 180 can display a character representing the key in an Internet address input window in response to a touch input performed on the key and can display an Internet page address assigned to the touched key in the Internet address input window, after the touch input is performed for a predetermined period of time.

Figure 10A:
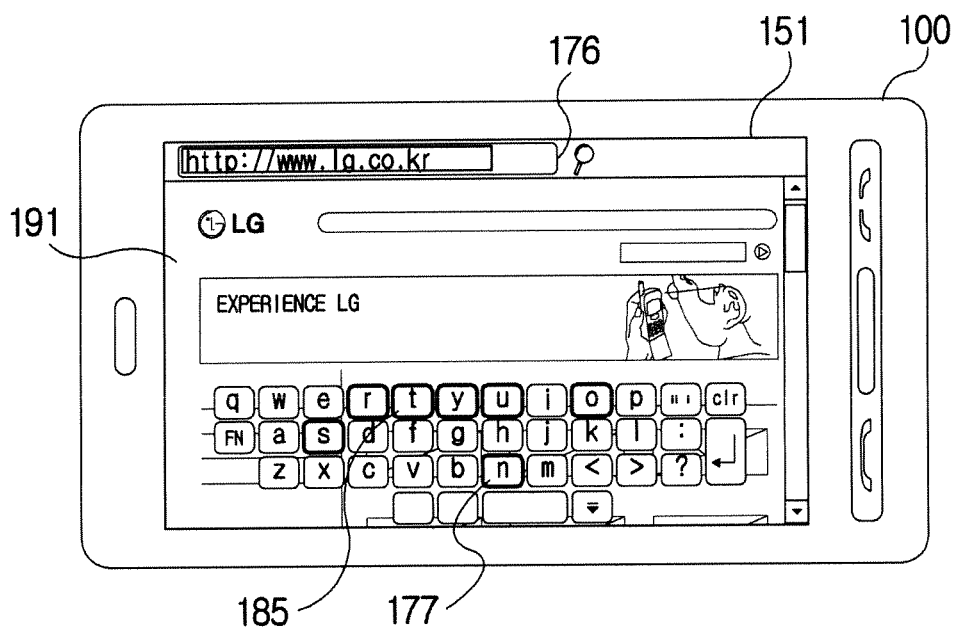
FIGS. 10A through 10C show an exemplary sequence of screens displayed in a mobile terminal for accessing an Internet page using an Internet address short-cut previously assigned to a key in accordance with one embodiment of the invention.
Figure 10B:
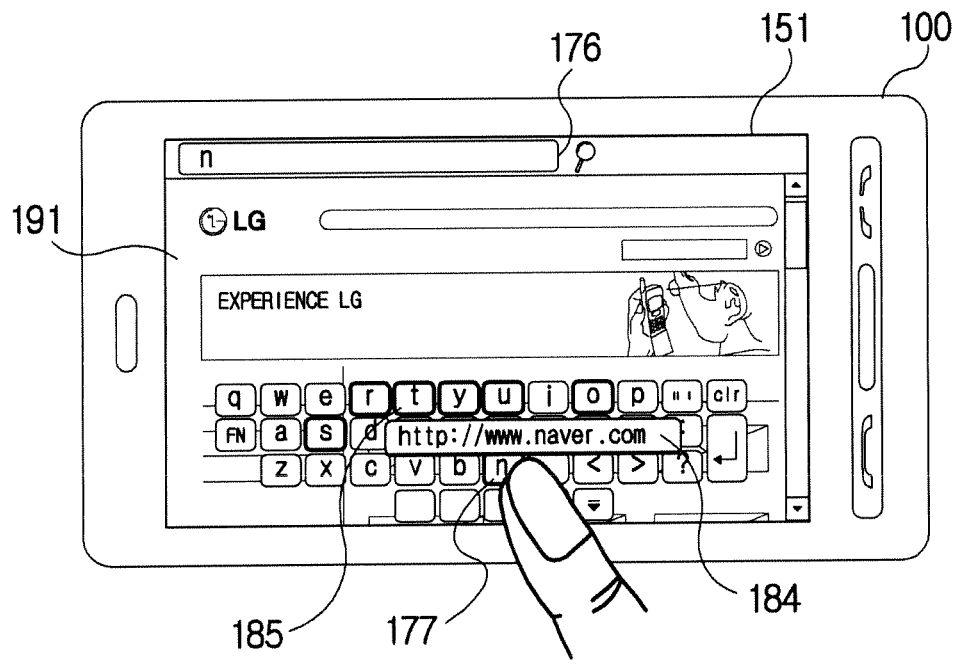
Figure 10C:
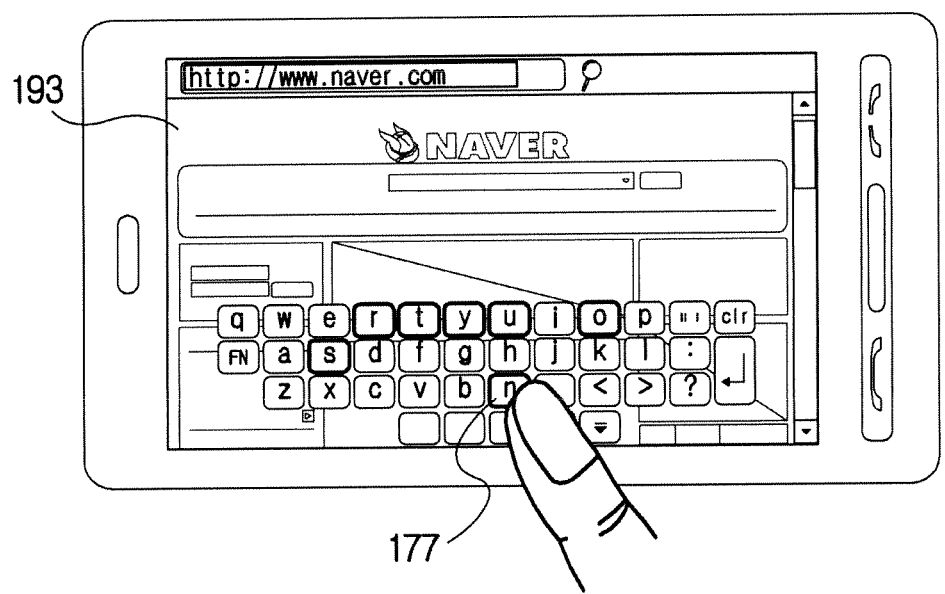

FIGS. 10A through 10C show an exemplary sequence of screens displayed in the mobile terminal 100 for accessing the Internet page using the Internet address short-cut previously assigned to a key using the techniques described above.

As shown in FIG. 10A, a virtual key pad is displayed over the contents of an Internet page 191 in the bottom portion of the display unit 151. Typically, the virtual key pad is not displayed during web browsing. While web browsing, when the user performs a touch input on the Internet address input window 176 such that the Internet address input window enters a mode for receiving inputs, such as characters and numbers, the virtual key pad is displayed over the contents displayed in the display unit 151.

As shown in FIG. 10A, the keys which have been previously assigned an Internet address short-cut are displayed with a thicker boundary, that is, a boundary having increased line weight, relative to the other keys in order to allow a user to identify the keys which have been assigned an Internet address short-cut.

As shown in FIG. 10B, when the user performs a touch input on one of the keys in the virtual keypad, such as key 177 or key 185, which has been previously assigned an Internet address short-cut, the Internet address is displayed in the bubble window 184. In one embodiment, the Internet address in the bubble window 184 can be input in the Internet address input window 176.

As shown in FIG. 10C, when the user maintains the touch input on a key, such as key 177, for a predetermined time, such as approximately 0.5 seconds to approximately 2 seconds, the Internet address of the Internet address short-cut is input in the Internet address input window 176. The controller 180 then accesses the Internet page corresponding to the input Internet address and the browsing screen is changed accordingly. In other words, the controller 180 receives a touch input on a key in a virtual key pad by a pointing device for a predetermined time and accesses an Internet page corresponding to an Internet address of an Internet address short-cut assigned to the touched key.

When the user terminates the touch input on a key previously assigned to an Internet address short-cut code, such as key 177 indicating the letter "n," the controller 180 determines that the user is manually entering an Internet address in the Internet address input window 176. The controller 180 allows the characters input by the user to be written in the Internet address input window 176.

Figure 11:
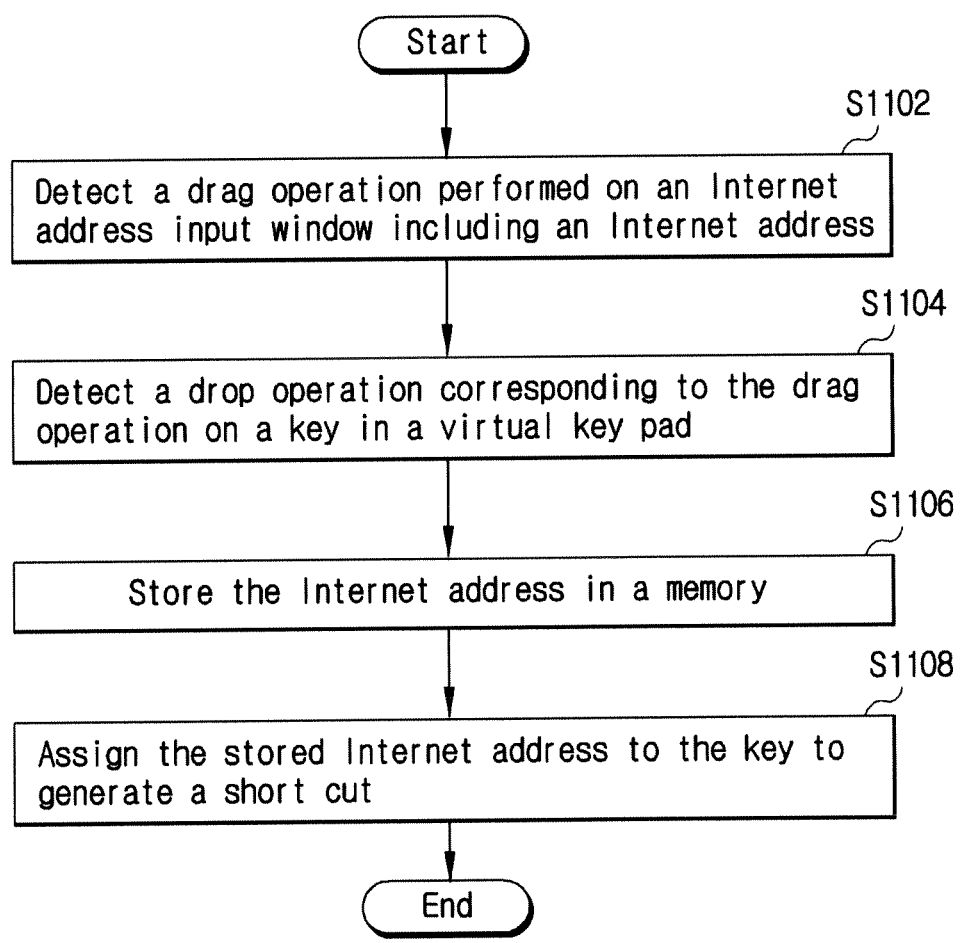
FIG. 11 is a flowchart illustrating a method for accessing an Internet in a mobile communication terminal in accordance with one embodiment of the present invention.

FIG. 11 is a flowchart illustrating a method for accessing an Internet in a mobile communication terminal in accordance with one embodiment of the present invention. With reference to FIGS. 1 and 8A through 8F, a drag operation performed on an Internet address input window 176 including an Internet address is detected by the controller 180 (S1102). Thereafter, a drop operation corresponding to the drag operation on a key in a virtual key pad, such as key 177, is detected by the controller 180 (S1104). The Internet address is stored by the controller 180 in a memory, such as the memory 160 (S1106). The stored Internet address is then assigned by the controller 180 to the key to generate a short-cut (S1108).

While the display unit 151 is implemented as a touch screen in the aforementioned embodiments, the present invention is not limited thereto. Various input units other than the touch screen can be provided to the user to implement the present invention.

While the present invention has been particularly shown and described with reference to exemplary embodiments thereof, it can be appreciated by those of ordinary skill in the art that various changes in form and details may be made without departing from the spirit and scope of the present invention as defined by the following claims.

In the present description, the terms "module" and "unit" are merely used herein to facilitate description of the components of the mobile terminal 100 and do not have any unique meaning per se. Accordingly, the terms "module" and "unit" are used interchangeably herein.

The mobile terminal 100 described in the specification can include a cellular phone, a smart phone, a laptop computer, a digital broadcasting terminal, personal digital assistants (PDA), a portable multimedia player (PMP), or a navigation system.

Depending on the type of implementation, it is possible that the present invention can take the form of an entirely hardware embodiment, an entirely software embodiment or an embodiment containing both hardware and software elements. A software embodiment may include, but not be limited to, firmware, resident software, or microcode stored in one or more storage mediums such as a ROM, a RAM, a CD-ROM, a magnetic tape, a floppy disk, or an optic data storage device. The storage mediums can further include the carrier wave for transmitting data via the internet.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

What is claimed is:

1. A mobile terminal comprising:
a memory configured to store information;
a touch screen configured to display an Internet address input window, at least a portion of an Internet page corresponding to an Internet address in the displayed Internet address input window, and a virtual key pad; and
a controller configured to:
control the touch screen to display the virtual key pad in response to a first touch input to an area on the touch screen on which the Internet address input window is displayed,
control the touch screen to display a duplicate window including the Internet address input window in response to a second touch input to the area on the touch screen on which the Internet address input window is displayed,
control the touch screen to move the displayed duplicate window in response to dragging the displayed duplicate window,
control the memory to store the Internet address in response to dropping the dragged duplicate window on a key of the displayed virtual key pad,
generate a shortcut by assigning the stored Internet address to the key,
control the touch screen to display a message indicating that the shortcut is generated, and
control the touch screen to display the key having a thicker boundary than before the shortcut was generated.

2. The mobile terminal of claim 1, wherein the controller is further configured to control the touch screen to:
change a content of the Internet address input window to an Internet address that is assigned to the key; and
display the Internet page corresponding to the Internet address that is assigned to the key.

3. A method for accessing the Internet via a mobile terminal, the method comprising:

receiving a first touch input to an area of a touch screen on which an Internet address input window that includes an Internet address is displayed;

displaying a virtual key pad on the touch screen in response to the received first touch input;

receiving a second touch input to the area of the touch screen on which the Internet address input window is displayed;

displaying a duplicate window including the Internet address input window in response to the received second touch input, the displayed duplicate window including the Internet address of the Internet address input window;

moving the displayed duplicate window in response to dragging the displayed duplicate window;

storing the Internet address in a memory in response to the received input to drop the dragged duplicate window on a key of the displayed virtual key pad;

generating a shortcut by assigning the stored Internet address to the key;

displaying a message indicating that the shortcut is generated, and displaying the key having a thicker boundary than before the shortcut was generated.

4. The method of claim 3, further comprising:

receiving a touch input to the key;

changing a content of the Internet address input window to the Internet address that is assigned to the key in response to the received touch input to the key; and displaying an Internet page corresponding to the Internet address that is assigned to the key.

5. The method of claim 4, wherein the second touch input comprises a proximity touch input.

6. The method of claim 5, wherein the displayed message is located near the key.

7. The method of claim 5, wherein the touch input to the key comprises a direct touch input.

8. The method of claim 4, further comprising:

determining whether a command input is received before displaying the Internet page.

9. The method of claim 4, further comprising:

receiving a third user touch input to the touch screen, wherein the Internet page is displayed only if the third user touch input is received.

10. The method of claim 4, wherein the second touch input comprises a direct touch input.

11. The method of claim 10, wherein the displayed message is located near the key.

12. The method of claim 10, wherein the touch input to the key is received for a predetermined period of time after the second touch input is received.

* * * * *